US010392480B2

(12) United States Patent
Cannas et al.

(10) Patent No.: US 10,392,480 B2
(45) Date of Patent: Aug. 27, 2019

(54) CATALYST CONTAINING AMIDINE GROUPS

(71) Applicant: SIKA TECHNOLOGY AG, Baar (CH)

(72) Inventors: Rita Cannas, Dübendorf (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/558,538

(22) PCT Filed: Apr. 15, 2016

(86) PCT No.: PCT/EP2016/058435
§ 371 (c)(1),
(2) Date: Sep. 14, 2017

(87) PCT Pub. No.: WO2016/166336
PCT Pub. Date: Oct. 20, 2016

(65) Prior Publication Data
US 2018/0171082 A1 Jun. 21, 2018

(30) Foreign Application Priority Data

Apr. 16, 2015 (EP) ..................................... 15163898

(51) Int. Cl.
| | | |
|---|---|---|
| *C08J 3/24* | (2006.01) | |
| *C08G 77/08* | (2006.01) | |
| *C09J 183/04* | (2006.01) | |
| *C08L 83/04* | (2006.01) | |
| *C08G 77/388* | (2006.01) | |
| *C08G 77/46* | (2006.01) | |
| *C09D 183/08* | (2006.01) | |
| *C09D 183/12* | (2006.01) | |
| *C09J 183/08* | (2006.01) | |
| *C09J 183/12* | (2006.01) | |

(52) U.S. Cl.
CPC ................ *C08J 3/24* (2013.01); *C08G 77/08* (2013.01); *C08G 77/388* (2013.01); *C08G 77/46* (2013.01); *C08L 83/04* (2013.01); *C09D 183/08* (2013.01); *C09D 183/12* (2013.01); *C09J 183/04* (2013.01); *C09J 183/08* (2013.01); *C09J 183/12* (2013.01); *C08J 2383/08* (2013.01); *C08J 2383/12* (2013.01)

(58) Field of Classification Search
None
See application file for complete search history.

(56) References Cited

U.S. PATENT DOCUMENTS

| | | | | |
|---|---|---|---|---|
| 4,144,221 A | * | 3/1979 | Ikeda | ..................... C08G 77/08 524/720 |
| 4,477,625 A | * | 10/1984 | Lockhart | .................. C08K 3/34 524/450 |
| 5,196,477 A | * | 3/1993 | Arai | ..................... C08K 5/0008 524/127 |
| 5,254,657 A | * | 10/1993 | Inoue | ..................... C08G 77/54 528/17 |
| 5,364,955 A | | 11/1994 | Zwiener et al. | |
| 5,840,805 A | * | 11/1998 | Nakashima | ............. C08L 83/04 524/731 |
| 7,790,781 B2 | * | 9/2010 | Bublewitz | ................ A61K 6/10 433/214 |
| 8,211,992 B2 | * | 7/2012 | Sunayama | .......... C08F 290/062 528/21 |
| 2009/0163662 A1 | * | 6/2009 | Yasuda | .............. C08G 18/4812 525/100 |
| 2009/0182099 A1 | * | 7/2009 | Noro | ..................... C08G 65/336 525/474 |
| 2010/0004367 A1 | * | 1/2010 | Yano | .................. C08G 65/2609 524/377 |
| 2010/0063215 A1 | * | 3/2010 | Yano | .................. C08G 65/2609 525/326.5 |
| 2010/0216925 A1 | * | 8/2010 | Yano | .................. C08G 65/2609 524/178 |

FOREIGN PATENT DOCUMENTS

| | | |
|---|---|---|
| EP | 1 985 666 A1 | 10/2008 |
| EP | 2 100 923 A1 | 9/2009 |
| EP | 2 388 297 A1 | 11/2011 |
| JP | 2007246577 A | 9/2007 |

OTHER PUBLICATIONS

Oct. 26, 2017 International Preliminary Report on Patentability issued in International Application No. PCT/EP2016/058435.
May 24, 2016 International Search Report issued in International Patent Application No. PCT/EP2016/058435.

* cited by examiner

*Primary Examiner* — Robert S Loewe
(74) *Attorney, Agent, or Firm* — Oliff PLC

(57) ABSTRACT

The use of an amidine of formula (I) and/or a conversion product thereof as a catalyst for the crosslinking of a composition based on silane group-containing polymers. The amidine of formula (I) and the conversion products thereof are essentially odorless at room temperature and non-volatile and accelerate the crosslinking of the composition very well without impairing the storage stability of the composition, and are very compatible in the composition. As a result, the compositions do not have a tendency to separate, migrate or evaporate the catalyst.

10 Claims, No Drawings

CATALYST CONTAINING AMIDINE GROUPS

TECHNICAL FIELD

The invention relates to catalysts containing amidine groups for compositions containing silane groups.

STATE OF THE ART

Curable compositions based on polymers containing silane groups play an important role in many industrial applications, for example as adhesives, sealants or coatings. Polymers containing silane groups here are especially polyorganosiloxanes, which are commonly referred to as "silicones" or "silicone rubbers", and organic polymers containing silane groups, which are also referred to as "silane-functional polymers", "silane-modified polymers" (SMP) or "silane-terminated polymers" (STP). They are cured via crosslinking reactions of the silane groups, which are hydrolyzed under the influence of moisture, condense with one another as silanol groups and in so doing form siloxane bonds. Catalysts are frequently used to accelerate the curing. These are very often substances of toxicological concern, which constitute a potential hazard to the user and environment, especially after the curing of the composition, when the catalyst or degradation products thereof are released as a result of outgassing, migration or washing-out.

Crosslinking catalysts used conventionally are organotin compounds, especially dialkyltin(IV) carboxylates. These are notable for very high activity in relation to the silanol condensation and are very hydrolysis-resistant, but they are harmful to health and a severe water pollution hazard. They are combined with further catalysts, mainly basic compounds, such as amines in particular, which specifically accelerate the preceding hydrolysis of the silane groups. Because greater weight is being given to EHS aspects by professional organizations and users and because of stricter government regulation, there have been increased efforts for some time to replace organotin compounds with other catalysts of lower toxicity. For instance, organotitanates, -zirconates and -aluminates have been described as alternative metal catalysts. However, these usually have lower catalytic activity in relation to the silanol condensation and bring about much slower crosslinking. Because of their lack of hydrolysis stability, they can lose a large part of their activity in the course of storage of the composition as a result of residual moisture in the ingredients, which causes the curing to slow significantly or stop entirely.

A further known alternative to organotin compounds is highly basic nitrogen compounds from the class of the amidines and guanidines, which can be used in combination with the metal catalysts mentioned or else alone. However, many of the commonly used amidine and guanidine catalysts, such as, in particular, 1,8-diazabicyclo[5.4.0]undec-7-ene (DBU) and 1,1,3,3-tetramethylguanidine (TMG), are volatile and odorous substances that are likewise harmful to health and hazardous to the environment. Moreover, they have a tendency to migrate because of low compatibility in the composition and hence to cause separation, exudation or substrate soiling. The described use of aromatic amidines and guanidines that are solid at room temperature provides a remedy here, but requires the use of suitable solvents and brings losses in catalytic activity and hence crosslinking rate.

SUMMARY OF THE INVENTION

It is therefore an object of the present invention to provide a catalyst for the crosslinking of compositions containing silane groups which has high catalytic activity and hence enables rapid curing of the composition applied, and also has high selectivity and hence does not unduly impair the storage stability of the composition. Furthermore, the catalyst is to have a low vapor pressure and high compatibility with the composition, such that it has no tendency either to separate or migrate or to evaporate, and if at all possible is to be odorless and of low toxicity.

This object is achieved by an amidine of the formula (I) and/or a reaction product thereof. The amidine of the formula (I) contains an aliphatic amidine group and exhibits high catalytic activity, whereas aromatic amidines are barely catalytically active or completely catalytically inactive. By contrast with many catalysts having aliphatic amidine or guanidine groups that are known from the prior art, it is substantially odorless and nonvolatile at room temperature. It exhibits high catalytic activity coupled with good selectivity. This is particularly surprising, given that, on the basis of the strong interactions of the polar groups and/or the elevated molecular weight, reduced activity would be expected as compared with smaller, less polar and hence more mobile amidines.

With these properties, the amidine of the formula (I) and/or a reaction product thereof is of excellent suitability as catalyst for the crosslinking of compositions based on polymers containing silane groups, where, as sole catalyst or in combination with further catalysts, it enables rapid curing to give a mechanically high-quality and durable material, without impairing the storability of the uncured composition. Both before and after curing, it has excellent compatibility with the composition and does not have any tendency either to separate or to migrate, by contrast with many similar amidine or guanidine catalysts according to the prior art, where catalyst-related migration effects play a major role. It enables low-emission and low-odor products which do not have greasy or tacky surfaces, nor do they cause substrate soiling. Finally, the amidine of the formula (I) and reaction products thereof are preparable in a surprisingly simple and rapid process without auxiliaries from commercially available, inexpensive starting materials.

Further aspects of the invention are the subject of further independent claims. Particularly preferred embodiments of the invention are the subject of the dependent claims.

Ways of Executing the Invention

The invention provides for the use of
at least one amidine of the formula (I)

$$Y-A-Z \qquad (I)$$

where
A is a divalent hydrocarbyl radical which has 2 to 30 carbon atoms and optionally contains unsaturated components and optionally ether oxygen or secondary or tertiary amine nitrogen,
Y is a hydroxyl, mercapto or amino group, and
Z is an amidine group bonded via a nitrogen atom,
where Y and Z are separated from one another by at least two carbon atoms,
and/or of
at least one reaction product of at least one amidine of the formula (I) with at least one functional compound
as catalyst for the crosslinking of a composition based on polymers containing silane groups,
where A is not a polyoxyalkylene radical and
where the amidine of the formula (I) does not contain any nitrogen atom which is directly bonded to an aromatic ring or is part of a heteroaromatic ring system, for example imidazole or pyrimidine.

In the present document, the term "silane group" refers to a silyl group which is bonded to an organic radical or to a polyorganosiloxane radical and has one to three, especially two or three, hydrolyzable substituents on the silicon atom. Particularly useful hydrolyzable substituents are alkoxy radicals. These silane groups are also referred to as "alkoxysilane groups". Silane groups may also be in partly or fully hydrolyzed form.

"Hydroxysilane", "isocyanatosilane", "am inosilane" and "mercaptosilane" refer respectively to organoalkoxysilanes having one or more hydroxyl, isocyanato, amino or mercapto groups on the organic radical in addition to the silane group.

"Functional compound" refers to a compound which can react via a reactive group with the amidine of the formula (I) to give a reaction product.

"Primary amino group" and "primary amine nitrogen" refer respectively to an $NH_2$ group and the nitrogen atom thereof that is bonded to an organic radical, and "secondary amino group" and "secondary amine nitrogen" refer respectively to an NH group and the nitrogen atom thereof that is bonded to two organic radicals which may also together be part of a ring, and "tertiary amino group" and "tertiary amine nitrogen" refer respectively to an N group and to the nitrogen atom thereof that is bonded to three organic radicals, two or three of which together may also be part of one or more rings.

"Polyoxyalkylene radical" refers to a linear hydrocarbyl radical which contains ether groups and contains more than two repeat units of the (O—R) type in succession, where R is an alkylene radical, as for example from the polyaddition of ethylene oxide or 1,2-propylene oxide onto starter molecules having two active hydrogen atoms.

Substance names beginning with "poly", such as polyol or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules. Polymers having a polyorganosiloxane backbone (commonly referred to as "silicones") are not organic polymers in the context of the present document.

The term "polyether containing silane groups" also encompasses organic polymers which contain silane groups and which, in addition to polyether units, may also contain urethane groups, urea groups or thiourethane groups. Such polyethers containing silane groups may also be referred to as "polyurethanes containing silane groups".

"Molecular weight" is understood in the present document to mean the molar mass (in grams per mole) of a molecule or part of a molecule, also referred to as "radical". "Mean molecular weight" is understood to mean the number-average $M_n$ of an oligomeric or polymeric mixture of molecules or radicals, which is typically determined by means of gel permeation chromatography (GPC) against polystyrene as standard.

"Storage-stable" or "storable" refers to a substance or composition when it can be stored at room temperature in a suitable container over a prolonged period, typically at least 3 months up to 6 months or more, without any change in its application or use properties, especially in the viscosity and crosslinking rate, to a degree of relevance for the use thereof as a result of the storage.

A dotted line in the formulae in this document in each case represents the bond between a substituent and the corresponding molecular radical. "Room temperature" refers to a temperature of about 23° C.

The amidine of the formula (I) may also be in tautomeric form. All possible tautomer forms of the amidine of the formula (I) are considered equivalent in the context of the present invention.

In addition, the amidine of the formula (I) may be in protonated form.

The amidine of the formula (I) may likewise be in complexed form, especially with cations of zinc, iron or molybdenum.

Preferably, Z is

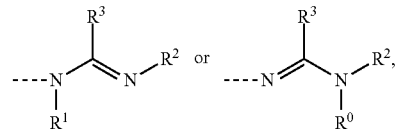

where $R^0$ is a hydrogen radical or is an alkyl or cycloalkyl or aralkyl radical having 1 to 8 carbon atoms, $R^1$ is a hydrogen radical or is an alkyl or cycloalkyl or aralkyl radical having 1 to 8 carbon atoms or together with $R^2$ is $R^4$, $R^2$ is a hydrogen radical or is an alkyl, cycloalkyl or aralkyl radical which has 1 to 18 carbon atoms and optionally contains ether oxygen or tertiary amine nitrogen, or together with $R^1$ is $R^4$, $R^3$ is a hydrogen radical or is an alkyl or cycloalkyl or aralkyl radical having 1 to 12 carbon atoms, and $R^4$ is 1,2-ethylene, 1,2-propylene, 1,3-propylene, 1,3-butylene or 1,3-pentylene, where $R^0$ and $R^2$ together may also be an alkylene radical which has 3 to 6 carbon atoms and optionally contains ether oxygen or tertiary amine nitrogen, and $R^2$ and $R^3$ together may also be an alkylene radical having 3 to 6 carbon atoms.

$R^0$ is preferably a hydrogen radical or is an alkyl radical having 1 to 4 carbon atoms, and especially a hydrogen radical.

$R^1$ is preferably a hydrogen radical or is an alkyl or cycloalkyl or aralkyl radical having 1 to 4 carbon atoms or together with $R^2$ is $R^4$.

$R^2$ is preferably an alkyl, cycloalkyl or aralkyl radical which has 1 to 12, especially 1 to 8, carbon atoms, and optionally contains ether oxygen or tertiary amine nitrogen, or together with $R^1$ is $R^4$.

$R^3$ is preferably a hydrogen radical or is an alkyl, cycloalkyl or aralkyl radical having 1 to 8, especially 1 to 4, carbon atoms.

$R^3$ is more preferably a hydrogen radical or a methyl radical, most preferably a methyl radical.

More preferably, Z is

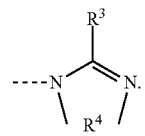

Such an amidine of the formula (I) is preparable in a particularly simple manner and in high purity.

Preferably, $R^4$ is 1,3-propylene. Such an amidine has particularly high catalytic activity.

Most preferably, $R^3$ is methyl and $R^4$ is 1,3-propylene.

Preferably, A has 2 to 20, especially 2 to 12, carbon atoms.

Y and Z are separated from one another by at least two carbon atoms. An amidine in which Y and Z are separated from one another by just one carbon atom is very unstable and therefore unsuitable for the use of the invention. An A radical having two carbon atoms is thus 1,2-ethylene and cannot be 1,1-ethylene.

More preferably A is selected from the group consisting of 1,2-ethylene, 1,3-propylene, 1,2-propylene, 1,3-pentylene, 1,1-dimethyl-1,2-ethylene, 1,5-pentylene, 2-methyl-1,5-pentylene, 1,6-hexylene, 2,2(4),4-trimethyl-1,6-hexamethylene, 1,8-octylene, 1,10-decylene, 1,12-dodecylene, (1,5,5-trimethylcyclohexan-1-yl)methane-1,3, 1,3-cyclohexylenebis(methylene), 1,4-cyclohexylenebis(methylene), 1,3-phenylenebis(methylene), 2- and/or 4-methyl-1,3-cyclohexylene, N-methyl-4-aza-1,7-heptylene, N-ethyl-4-aza-1,7-heptylene, 3-aza-1,5-pentylene, 4-aza-1,7-heptylene, 3-aza-1,6-hexylene, 7-aza-1,13-tridecylene, 3-oxa-1,5-pentylene, 3,6-dioxa-1,8-octylene and 4,7-dioxa-1,10-decylene.

Such an amidine of the formula (I) is obtainable in a particularly simple manner and is particularly catalytically active.

In a preferred embodiment, Y is $NR^8R^9$ where $R^8$ and $R^9$ are independently an alkyl radical having 1 to 8 carbon atoms, or together are an alkylene radical having 4 to 10 carbon atoms.

These amidines of the formula (I) have the advantage that they have particularly high catalytic activity and are preparable in a particularly simple manner.

In a further preferred embodiment, Y is HX where X is O or S or $NR^7$ where $R^7$ is a hydrogen radical or is an alkyl or cycloalkyl or aralkyl radical having 1 to 8 carbon atoms.

Such an amidine of the formula (I) is an amidine of the formula (I a).

$$HX-A-Z \quad (I\ a)$$

In the formula (I a), A, X and Z have the definitions already stated.

An amidine of the formula (I a) has the advantage that it can be reacted in a particularly simple manner with a functional compound to give a reaction product.

X is preferably $NR^7$. Such an amidine has particularly high catalytic activity and can be reacted in a very particularly simple manner with a functional compound to give a reaction product.

$R^7$ is preferably a hydrogen radical.

$R^7$ is additionally preferably an alkyl or cycloalkyl radical having 1 to 8 carbon atoms.

More preferably, Y is thus $NR^8R^9$ or $NHR^7$. Such amidines of the formula (I) are particularly catalytically active.

A suitable amidine of the formula (I) is especially obtained by the reaction of at least one amine of the formula (II a) or (II b)

$$Y-A-NHR^1 \quad (II\ a)$$

$$Y-A-NH-R^4-NH_2 \quad (II\ b)$$

optionally at least one amine of the formula $R^2-NH-R^0$, and at least one reagent for introduction of amidine groups.

In these formulae, Y, A, $R^0$, $R^1$, $R^2$ and $R^4$ have the definitions already stated.

The reaction product from this reaction can be used without further workup as catalyst for the crosslinking of a composition based on polymers containing silane groups.

Suitable amines of the formula (II a) or (II b) are especially aliphatic or cycloaliphatic hydroxy amines, especially 2-aminoethanol, 2-methylaminoethanol (2-amino-1-propanol), 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol, a primary amino group-bearing derivative of glycols such as diethylene glycol, dipropylene glycol, dibutylene glycol, 2-(2-aminoethoxy)ethanol, 2-(2-(2-aminoethoxy)ethoxy)ethanol, products from the single cyanoethylation and subsequent hydrogenation of glycols, especially 3-(2-hydroxyethoxy)propylamine, 3-(2-(2-hydroxyethoxy)ethoxy)propylamine or 3-(6-hydroxyhexyloxy)-propylamine, and also hydroxy amines having one primary and one secondary amino group, such as, in particular, N-(2-aminoethyl)-2-aminoethanol, N-(3-aminopropyl)-2-aminoethanol or N-(2-aminopropyl)-2-aminoethanol;

aliphatic mercapto amines, especially 2-aminoethanethiol (cysteamine), 3-aminopropanethiol, 4-amino-1-butanethiol, 6-amino-1-hexanethiol, 8-amino-1-octanethiol, 10-amino-1-decanethiol or 12-amino-1-dodecanethiol;

aliphatic, cycloaliphatic or arylaliphatic primary diamines, especially ethylenediamine, propane-1,2- and -1,3-diamine, 2-methylpropane-1,2-diamine, 2,2-dimethylpropane-1,3-diamine, butane-1,3- and -1,4-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2,4- and 2,4,4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, bis(4-aminocyclohexyl)methane, bis(4-amino-3-methylcyclohexyl)-methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPD), 2- and/or 4-methyl-1,3-diaminocyclohexane, 1,3- or 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, 1,3-bis(aminomethyl)-benzene, 1,4-bis(aminomethyl)benzene, 4-aminomethyl-1,8-octanediamine, or products from the double cyanoethylation and subsequent reduction of fatty amines derived from natural fatty acids, such as N,N-bis(3-aminopropyl)dodecylamine or N,N-bis(3-aminopropyl)tallowalkylamine, available as Triameen® Y12D or Triameen® YT (from Akzo Nobel);

aliphatic or cycloaliphatic primary diamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine or 4,7,10-trioxatridecane-1,13-diamine;

diamines having one primary and one secondary amino group, especially N-methylethane-1,2-diamine, N-ethylethane-1,2-diamine, N-butylethane-1,2-diamine, N-hexylethane-1,2-diamine, N-(2-ethylhexyl)ethane-1,2-diamine, N-cyclohexylethane-1,2-diamine, 4-aminomethylpiperidine, 3-(4-aminobutyl)piperidine, N-methylpropane-1,3-diamine, N-ethylpropane-1,3-diamine, N-butylpropane-1,3-diamine, N-hexylpropane-1,3-diamine, N-(2-ethylhexyl)-propane-1,3-diamine, N-dodecylpropane-1,3-diamine, N-cyclohexylpropane-1,3-diamine, 3-methylamino-1-pentylamine, 3-ethylamino-1-pentylamine, 3-butylamino-1-pentylamine, 3-hexylamino-1-pentylamine, 3-(2-ethylhexyl)-amino-1-pentylamine, 3-dodecylamino-1-pentylamine, 3-cyclohexylamino-1-pentylamine, or 3-aminopropylated fatty amines such as, in particular, N-coco-alkylpropane-1,3-diamine, N-oleylpropane-1,3-diamine, N-soyaalkylpropane-1,3-diamine, N-tallowalkylpropane-1,3-diamine or N—($C_{16-22}$-alkyl)propane-1,3-diamine, as available, for example, under the Duomeen® trade name (from Akzo Nobel);

polyalkyleneamines and further polyamines having primary and secondary and/or tertiary amino groups, especially diethylenetriamine (DETA), dipropylenetriamine (DPTA), N-(2-aminoethyl)propane-1,3-diamine (N3 amine), N3-(3-aminopentyl)pentane-1,3-diamine, N5-(3-aminopropyl)-2-methylpentane-1,5-diamine, N5-(3-amino-1-ethylpropyl)-2-methylpentane-1,5-diamine, N-(2-aminoethyl)piperazine, N-(2-aminopropyl)piperazine, 3-(dimethylamino)ethylamine, 3-(dimethylamino)propylamine, 3-(diethylamino)ethylamine, 3-(diethylamino)propylamine, $N^1,N^1$-diethylpentane-1,4-diamine, $N^1$-((3-dimethylamino)propyl)-1,3-diaminopropane, or N-alkyl-N'-(2-aminoethyl)ethane-1,2-diamine or N-alkyl-N'-(3-aminopropyl)ethane-1,2-diamine or N-alkyl-N'-(2-aminoethyl)propane-1,3-diamine or N-alkyl-N'-(3-aminopropyl)propane-1,3-diamine having alkyl groups such as, in particular, methyl, ethyl, butyl, hexyl, 2-ethylhexyl, dodecyl, cyclohexyl or benzyl.

Preferably, the amine of the formula (II a) or (II b) is selected from the group consisting of 1,5-diamino-2-methylpentane (MPMD), hexane-1,6-diamine, 2,2,4- and 2,4,4-trimethylhexamethylenediamine (TMD), octane-1,8-diamine, decane-1,10-diamine, dodecane-1,12-diamine, 1-amino-3-aminomethyl-3,5,5-trimethylcyclohexane (isophoronediamine or IPD), 1,3-bis(aminomethyl)cyclohexane, 1,4-bis(aminomethyl)cyclohexane, 1,3-bis(aminomethyl)benzene, diethylenetriamine, dipropylenetriamine, N-(2-aminoethyl)propane-1,3-diamine (N3 amine), 3-(dimethylamino)ethylamine, 3-(dimethylamino)propylamine, 3-(diethylamino)ethylamine, 3-(diethylamino)-propylamine, $N^1$-((3-dimethylamino)propyl)-1,3-diaminopropane, bis(2-aminoethyl) ether, 3,6-dioxaoctane-1,8-diamine, 4,7-dioxadecane-1,10-diamine, 5-amino-1-pentanol, 6-amino-1-hexanol, 3-aminomethyl-3,5,5-trimethylcyclohexanol, 2-(2-aminoethoxy)-ethanol, N-(2-aminoethyl)-2-aminoethanol, N-(3-aminopropyl)-2-aminoethanol and N-alkyl-N'-(2-aminoethyl)ethane-1,2-diamine, N-alkyl-N'-(3-aminopropyl)-ethane-1,2-diamine, N-alkyl-N'-(2-aminoethyl)propane-1,3-diamine and N-alkyl-N'-(3-aminopropyl)propane-1,3-diamine having alkyl groups selected from methyl, ethyl, butyl, hexyl and benzyl.

Suitable amines of the formula $R^2$—NH—$R^0$ are aliphatic, cycloaliphatic or arylaliphatic monoamines, especially amines of the formula $R^2$—$NH_2$. Preference is given to methylamine, ethylamine, propylamine, isopropylamine, n-butylamine, isobutylamine, sec-butylamine, n-hexylamine, cyclohexylamine, benzylamine, 2-ethylhexylamine, n-octylamine, n-decylamine, laurylamine or 2-methoxyethylamine.

The reagent for introduction of amidine groups is preferably selected from the group consisting of orthoesters, 1,3-keto esters, 1,3-keto amides, nitriles, imidoyl esters, imidoyl chlorides, amides and lactams.

Among these, preference is given to orthoesters, 1,3-keto esters or nitriles. Preferred orthoesters are orthoesters of the formula $R^3$—$C(OR^a)_3$ where $R^a$ is an alkyl radical having 1 to 4 carbon atoms and $R^3$ has the definitions already stated, especially an orthoformate, orthoacetate, orthopropionate, orthobutyrate or orthovalerate, more preferably trimethyl orthoformate, triethyl orthoformate, trimethyl orthoacetate or triethyl orthoacetate.

Preferred 1,3-keto esters are the 1,3-keto esters of the formula $R^3$—$C(O)CH_2C(O)OR^a$ where $R^a$ and $R^3$ have the definitions already stated, especially methyl acetoacetate, ethyl acetoacetate, isopropyl acetoacetate or tert-butyl acetoacetate, more preferably ethyl acetoacetate.

Preferred nitriles are nitriles of the formula $R^3$—CN where $R^3$ has the definitions already stated, especially acetonitrile, propionitrile, butyronitrile, isobutyronitrile, valeronitrile or capronitrile, more preferably acetonitrile.

The reagent for introduction of amidine groups is more preferably selected from the group consisting of trimethyl orthoformate, triethyl orthoformate, trimethyl orthoacetate, triethyl orthoacetate, methyl acetoacetate, ethyl acetoacetate, isopropyl acetoacetate, tert-butyl acetoacetate and acetonitrile.

With these reagents, amidines of the formula (I) of particularly high catalytic activity are obtained in a particularly simple manner.

The reaction is preferably conducted at elevated temperature, optionally under elevated pressure and optionally in the presence of a catalyst, preferably with removal of elimination products released from the reagent, such as alcohols, esters or amines, during or after the reaction, especially by means of distillation, optionally under reduced pressure.

Preferably, the ratio between the amine of the formula (II a) or (II b), any amine of the formula $R^2$—NH—$R^0$ present and the reagent is chosen such that the reagent is fully converted in the reaction.

If an orthoester of the formula $R^3$—$C(OR^a)_3$ is used, the reaction is preferably effected at a temperature of 40 to 160° C., especially 60 to 140° C., preferably with distillative removal of the alcohol $R^aOH$ released. Optionally, a catalyst is used here, especially an acid.

If a 1,3-keto ester of the formula $R^3$—$C(O)CH_2C(O)OR^a$ is used, the reaction is preferably effected at a temperature of 20 to 100° C., especially 40 to 80° C., preferably with distillative removal of the ester $CH_3C(O)OR^a$ released.

Preference is given here to using a catalyst, especially an acid, preferably a sulfonic acid.

If a nitrile of the formula $R^3$—CN is used, the conversion is preferably effected at a temperature of 60 to 180° C., especially 80 to 160° C., optionally under elevated pressure, preferably with distillative removal of the ammonia released. Preference is given here to using a catalyst, especially a Lewis acid, preferably boron trifluoride etherate, lithium perchlorate, zinc chloride, zinc(III) trifluoromethanesulfonate or lanthanum(III) trifluoromethanesulfonate.

Particular preference is given to using an amine of the formula (II b), especially selected from the group consisting of diethylenetriamine, dipropylenetriamine, N-(2-aminoethyl)propane-1,3-diamine (N3 amine), $N^1$-((3-dimethylamino)-propyl)-1,3-diaminopropane, N-(2-aminoethyl)-2-aminoethanol, N-(3-aminopropyl)-2-aminoethanol and N-alkyl-N'-(2-aminoethyl)ethane-1,2-diamine, N-alkyl-N'-(3-aminopropyl)ethane-1,2-diamine, N-alkyl-N'-(2-aminoethyl)propane-1,3-diamine and N-alkyl-N'-(3-aminopropyl)propane-1,3-diamine having alkyl groups selected from methyl, ethyl, butyl, hexyl and benzyl.

With these amines, it is possible in a simple manner to prepare an amidine of
the formula (I) with Z of the formula

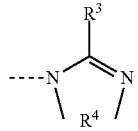

without additional use of an amine of the formula $R^2$—NH—$R^0$.

A preferred amidine of the formula (I) is selected from the group consisting of 1-(2-hydroxyethyl)-2-methylimidazoline, 1-(2-aminoethyl)-2-methylimidazoline, 1-(3-aminopropyl)-2-methylimidazoline, 1-(2-hydroxyethyl)-2-methyl-1,4,5,6-tetrahydropyrimidine, 1-(2-aminoethyl)-2-methyl-1,4,5,6-tetrahydropyrimidine, 1-(3-aminopropyl)-2-methyl-1,4,5,6-tetrahydropyrimidine and 1-(3-dimethylaminopropyl)-2-methyl-1,4,5,6-tetrahydropyrimidine.

Among these, preference is given to the aminoamidines, which have particularly high catalytic activity.

Among these, preference is also given to the tetrahydropyrimidines, which have particularly high catalytic activity.

Among these, particular preference is given to 1-(3-dimethylaminopropyl)-2-methyl-1,4,5,6-tetrahydropyrimidine. This amidine of the formula (I) is preparable from readily available starting materials in a simple process and in high purity and has very particularly high catalytic activity.

In a preferred embodiment, the amidine of the formula (I) is at least partly in the form of a reaction product with a functional compound.

The functional compound preferably has reactive groups that are reactive toward hydroxyl, mercapto or amino groups. The functional compound thus reacts preferentially via the Y group with the amidine of the formula (I). Preferably, Y here is HX.

Preferably, the functional compound has at least one reactive group selected from epoxide, aziridine, carbonate, carboxylic anhydride, carboxylic acid, carboxylic ester, lactone, carbonyl chloride, ketone, aldehyde, 1,3-diketone, 1,3-keto ester, 1,3-keto amide, cyanate, thiocyanate, isocyanate, isothiocyanate, (meth)acrylate, (meth)acrylamide, (meth)acrylonitrile, maleate, maleamide, maleimide, fumarate, fumaramide, itaconate, itaconamide, crotonate and crotonamide.

Among these, preference is given to epoxide, carbonate, carboxylic anhydride, carboxylic ester, lactone, ketone, aldehyde, 1,3-diketone, 1,3-keto ester, 1,3-keto amide, cyanate, isocyanate, acrylate, methacrylate, acrylamide, methacrylamide, maleate, maleimide, fumarate or itaconate.

Particular preference is given to epoxide, carbonate, carboxylic ester, lactone, ketone, aldehyde, 1,3-diketone, 1,3-keto ester, isocyanate, acrylate or methacrylate.

Compounds having the preferred reactive groups are obtainable in a particularly simple manner and enable, in a particularly simple process, stable reaction products having high catalytic activity.

A preferred epoxide group is a glycidyl group, especially a glycidyloxy group. A functional compound of this kind can be reacted with the amidine of the formula (I) in a particularly simple manner.

A preferred aziridine group is an N-aziridinyl group. Such a functional compound is readily available and can be reacted particularly efficiently with an amidine of the formula (I).

The functional compound preferably has one to six of the reactive groups mentioned, more preferably one or two or three of the reactive groups mentioned.

If the functional compound has more than one reactive group, these groups are preferably the same, as for example in diepoxides or triacrylates. Alternatively, it is possible that the functional compound has different reactive groups.

Suitable functional compounds are especially commercially available substances.

Suitable functional compounds having at least one epoxide group are especially
aliphatic monoepoxides, preferably propylene oxide, butylene oxide, hexylene oxide, glycidol, allyl glycidyl ether, butyl glycidyl ether, hexyl glycidyl ether, 2-ethylhexyl glycidyl ether, and glycidyl ethers of fatty alcohols, such as, in particular, $C_8$- to $C_{10}$-alkyl glycidyl ether or $C_{12}$- to $C_{14}$-alkyl glycidyl ether, and epoxysilanes such as 3-glycidoxypropyltrimethoxysilane, 3-glycidoxypropyltriethoxysilane, 3-glycidoxypropyldimethoxymethylsilane or 3-glycidoxypropyldiethoxymethylsilane;
aromatic monoepoxides, preferably styrene oxide, or glycidyl ethers of phenol, cresol, tert-butylphenol or cardanol;
aliphatic or cycloaliphatic polyepoxides containing ether groups, preferably glycidyl ethers of glycols such as ethylene glycol, propylene glycol, butylene glycol, hexanediol, octanediol, polypropylene glycols, dimethylolcyclohexane, neopentyl glycol, castor oil, trimethylolpropane, trimethylolethane, pentaerythritol, glycerol, alkoxylated glycerol or alkoxylated trimethylolpropane, and ring-hydrogenated bisphenol A, F or A/F liquid resins; or
aromatic polyepoxides, preferably diglycidyl ethers of bisphenol A, bisphenol F or bisphenol A/F or novolak glycidyl ethers, especially in the form of what are called liquid resins as commercially available, for example, from Dow, Huntsman or Hexion.

Suitable functional compounds having at least one aziridine group are N-alkylaziridines, especially Michael adducts of aziridine or 2-methylaziridine, preferably methyl 3-(aziridin-1-yl)propanoate, methyl 3-(2-methylaziridin-1-yl)-propanoate, butyl 3-(aziridin-1-yl)propanoate, butyl 3-(2-methylaziridin-1-yl)-propanoate, 2-hydroxyethyl 3-(aziridin-1-yl)propanoate, 2-hydroxyethyl 3-(2-methylaziridin-1-yl) propanoate, 1,1,1-trimethylolpropane tris(3-(aziridin-1-yl)-propanoate), 1,1,1-trimethylolpropane tris(3-(2-methylaziridin-1-yl)propanoate), pentaerythritol tris(3-(aziridin-1-yl)propanoate), pentaerythritol tris(3-(2-methylaziridin-1-yl)propanoate), pentaerythritol tetrakis(3-(aziridin-1-yl)propanoate) or pentaerythritol tetrakis(3-(2-methylaziridin-1-yl)propanoate).

Suitable functional compounds having at least one carbonate group are dialkyl carbonates, preferably dimethyl carbonate, and especially cyclic carbonates, preferably ethylene carbonate, 1,2-propylene carbonate, 4-ethyl-1,3-dioxolan-2-one, 1,3-dioxan-2-one or 5,5-diethyl-1,3-dioxan-2-one, or cyclic carbonates obtainable by insertion of $CO_2$ into the epoxide group(s) of the abovementioned functional compounds having at least one epoxide group. Particular preference is given to 1,2-propylene carbonate.

Suitable functional compounds having at least one carboxylic anhydride group are anhydrides of monocarboxylic acids, preferably acetic anhydride, and especially cyclic anhydrides of dicarboxylic acids or polycarboxylic acids, preferably succinic anhydride, maleic anhydride, hexahydrophthalic anhydride, methylhexahydrophthalic anhydride, tetrahydrophthalic anhydride, phthalic anhydride, methylphthalic anhydride, trimellitic anhydride, pyromellitic dianhydride or 4,4'-[(isopropylidene)bis(p-phenyleneoxy)]diphthalic dianhydride.

Suitable functional compounds having at least one carboxylic ester group are especially

- alkyl esters of aliphatic, cycloaliphatic and arylaliphatic monocarboxylic acids, preferably of formic acid, acetic acid, propionic acid, butyric acid, isobutyric acid, valeric acid, caproic acid, 2-ethylcaproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachic acid, palmitoleic acid, oleic acid, erucic acid, cyclohexanecarboxylic acid or phenylacetic acid, and mixtures of saturated and/or mono- and/or polyunsaturated fatty acids as obtained in the hydrolysis of natural fats and oils of vegetable or animal origin;
- alkyl esters of aromatic monocarboxylic acids, preferably of benzoic acid, toluic acid, salicylic acid, anisic acid or naphthoic acid;
- dialkyl esters of aliphatic and cycloaliphatic dicarboxylic acids (called dibasic esters), preferably of oxalic acid, malonic acid, succinic acid, glutaric acid, adipic acid, pimelic acid, suberic acid, azelaic acid, sebacic acid, dodecane-1,12-dioic acid, hexahydrophthalic acid, hexahydroisophthalic acid, methylhexahydrophthalic acid, hexahydroterephthalic acid, dimer fatty acids, 3,6,9-trioxaundecanedioic acid or of similar derivatives of polyethylene glycol;
- dialkyl esters of aromatic dicarboxylic acids, preferably of phthalic acid, isophthalic acid or terephthalic acid;
- esters of tri- or polyfunctional carboxylic acids, preferably of citric acid or trimellitic acid.

Particular preference is given here to the methyl or ethyl esters.

Suitable functional compounds having at least one lactone group are β-, γ-, δ- or ε-lactones, preferably β-butyrolactone, γ-butyrolactone, γ-valerolactone, γ-caprolactone, γ-heptalactone, γ-octalactone, γ-nonalactone, γ-decalactone, γ-undecalactone, γ-dodecalactone, δ-valerolactone, δ-caprolactone, δ-heptalactone, δ-octalactone, δ-nonalactone, δ-decalactone, δ-undecalactone, δ-dodecalactone, ε-caprolactone, ε-heptalactone, ε-octalactone, ε-nonalactone, ε-decalactone, ε-undecalactone or ε-dodecalactone. Especially suitable are γ-, δ- or ε-lactones, preferably γ-butyrolactone, γ-valerolactone, γ-caprolactone, γ-octalactone, γ-nonalactone, γ-decalactone, γ-undecalactone, γ-dodecalactone, δ-valerolactone, δ-caprolactone, δ-nonalactone, δ-decalactone, δ-undecalactone, δ-dodecalactone, ε-caprolactone, ε-decalactone, ε-undecalactone or ε-dodecalactone. Particular preference is given to γ-butyrolactone, γ-valerolactone, δ-valerolactone, δ-caprolactone or ε-caprolactone.

Suitable functional compounds having at least one keto group are especially

- aliphatic, cycloaliphatic or aromatic ketones, preferably acetone, methyl ethyl ketone, methyl propyl ketone, methyl isopropyl ketone, methyl isobutyl ketone, methyl pentyl ketone, methyl isopentyl ketone, diethyl ketone, dipropyl ketone, diisopropyl ketone, dibutyl ketone, diisobutyl ketone, cyclopentanone, cyclohexanone, acetophenone, propiophenone or benzophenone;
- diketones, preferably butane-2,3-dione, pentane-2,3-dione, hexane-2,3-dione, hexane-3,4-dione, hexane-2,5-dione, 3,4-dimethylhexane-2,5-dione, 1,2-dibenzoylethane, 1,4-bis(2-furyl)butane-1,4-dione, 2-(2-oxopropyl)-cyclopentanone, 1,2-diacetylbenzene, 1,3-diacetylbenzene, 1,4-diacetylbenzene, 1,2-diacetylcyclohexane, 1,3-diacetylcyclohexane or 1,4-diacetylcyclohexane;
- triketones, preferably 1,3,5-triacetylbenzene or 1,3,5-triacetylcyclohexane.

Suitable functional compounds having at least one aldehyde group are especially

- aliphatic, cycloaliphatic or aromatic aldehydes, preferably formaldehyde, acetaldehyde, propanal, 2-methylpropanal, 2,2-dimethylpropanal, 2,2-dimethyl-3-phenylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropanecarboxaldehyde, cyclopentanecarboxaldehyde, cyclohexanecarboxaldehyde, diphenylacetaldehyde, benzaldehyde, the isomeric tolualdehydes, 4-ethyl- or 4-propyl- or 4-isopropyl or 4-butylbenzaldehyde, 2,4-dimethylbenzaldehyde, 2,4,5-trimethylbenzaldehyde, 4-acetoxybenzaldehyde, 4-anisaldehyde, 4-ethoxybenzaldehyde, the isomeric di- or trialkoxybenzaldehydes, 2-, 3- or 4-nitrobenzaldehyde, 2-, 3- or 4-formylpyridine, furfural, 2-thiophenecarbaldehyde, 1- or 2-naphthylaldehyde, 3- or 4-phenyloxybenzaldehyde, quinoline-2-carbaldehyde or the positional 3, 4, 5, 6, 7 or 8 isomers thereof, anthracene-9-carbaldehyde, cinnamaldehyde or substituted cinnamaldehydes;
- aldehydes having hydroxyl groups, preferably 2,2-dimethyl-3-hydroxypropanal, 3-bis(2-hydroxyethyl)amino-2,2-dimethylpropanal, 3-bis(2-hydroxypropyl)amino-2,2-dimethylpropanal, the isomeric salicylaldehydes or vanillin;
- aldehydes having ester groups, preferably 2,2-dimethyl-3-formoxypropanal, 2,2-dimethyl-3-acetoxypropanal, 2,2-dimethyl-3-isobutoyloxypropanal, 2,2-dimethyl-3-caproyloxypropanal, 2,2-dimethyl-3-(2-ethylhexoyloxy)propanal, 2,2-dimethyl-3-capryloyloxypropanal, 2,2-dimethyl-3-caprinoyloxypropanal, 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal, 2,2-dimethyl-3-oleyloxypropanal, 2,2-dimethyl-3-benzoyloxypropanal or methyl or ethyl glyoxylate;
- aldehydes having ether groups, preferably 2,2-dimethyl-3-phenoxypropanal, 3-cyclohexyloxy-2,2-dimethylpropanal, 2,2-dimethyl-3-(2-ethylhexyloxy)-propanal, 2,2-dimethyl-3-lauroxypropanal or 2,2-dimethyl-3-stearoxypropanal;

aldehydes having tertiary amino groups, preferably 2,2-dimethyl-3-(N,N-dimethylamino)propanal, 2,2-dimethyl-3-(N,N-diethylamino)propanal, 2,2-dimethyl-3-(N,N-dibutylamino)propanal, 2,2-dimethyl-3-(N-pyrrolidino)-propanal, 2,2-dimethyl-3-(N-piperidino) propanal, 2,2-dimethyl-3-(N-morpholino)propanal, 3-(N-(2,6-dimethylmorpholino))propanal, 3-bis-(methoxyethyl)amino-2,2-dimethylpropanal or 3-bis(2-hydroxypropyl)amino-2,2-dimethylpropanal;

dialdehydes, preferably glyoxal, glutaraldehyde, orthophthalaldehyde, isophthalaldehyde, terephthalaldehyde, naphthalenedicarboxaldehyde, anthracenedicarboxaldehyde, 2,5-furandicarbaldehyde, 2,5-thiophenedicarbaldehyde, cyclopentanedicarbaldehyde, 1,2-cyclohexanedicarbaldehyde, 1,3-cyclohexanedicarbaldehyde, 1,4-cyclohexanedicarbaldehyde, 2(3),5(6)-diformylbicyclo[2.2.1]heptane (norbornanedicarbaldehyde), 3(4),8(9)-diformyltricyclo[5.2.1.0$^{2,6}$]decane (tricyclodecanedicarbaldehyde or TCD dialdehyde), 2,5-tetrahydrofurandicarbaldehyde, 2,5-tetrahydrothiophenedicarbaldehyde, 1,3-bis(4,4-dimethyl-5-oxo-2-pentyl)benzene, 1,4-bis(4,4-dimethyl-5-oxo-2-pentyl)benzene, 3-(3-oxopropyl)cyclohexanecarbaldehyde, 4-(3-oxopropyl)-cyclohexanecarbaldehyde, 3-(1-formylethyl)cyclohexanecarbaldehyde, 4-(1-formylethyl)cyclohexanecarbaldehyde, N,N'-bis(2,2-dimethyl-3-oxopropyl)-piperazine, N,N'-bis(2,2-diethyl-3-oxopropyl)piperazine, N,N'-bis(2-methyl-2-propyl-3-oxopropyl)piperazine or N,N'-bis(2-butyl-2-ethyl-3-oxopropyl)-piperazine;

trialdehydes, preferably benzene-1,3,5-tricarbaldehyde or cyclohexane-1,3,5-tricarbaldehyde.

Preferred functional compounds having at least one 1,3-diketo group are pentane-2,4-dione, heptane-3,5-dione, 6-methylheptane-3,5-dione, 2,2,6,6-tetramethylheptane-3,5-dione, 2,2,4,6,6-pentamethylheptane-3,5-dione, 1,3-diphenylpropane-1,3-dione, 3-phenylpentane-2,4-dione, 2-acetylcyclopentanone or 2-acetylcyclohexanone.

Preferred functional compounds having at least one 1,3-keto ester group are methyl acetoacetate, ethyl acetoacetate, propyl acetoacetate, isopropyl acetoacetate, butyl acetoacetate, tert-butyl acetoacetate, ethyl 3-oxovalerate or ethyl 3-oxohexanoate, or polyfunctional acetoacetates from the polyesterification of polyols, preferably ethylene glycol bis(acetoacetate), propylene glycol bis(acetoacetate), diethylene glycol bis(acetoacetate), dipropylene glycol bis(acetoacetate), propane-1,3-diol bis(acetoacetate), butane-1,4-diol bis(acetoacetate), pentane-1,5-diol bis(acetoacetate), 3-methylpentane-1,5-diol bis(acetoacetate), hexane-1,6-diol bis(acetoacetate), 2,2(4),4-trimethylhexane-1,6-diol bis(acetoacetate), poly(oxyalkylene) bis(acetoacetate), cyclohexane-1,3-dimethanol bis(acetoacetate), cyclohexane-1,4-diol bis(acetoacetate), glycerol tris(acetoacetate) or trimethylolpropane tris(acetoacetate).

Preferred functional compounds having at least one 1,3-keto amide group are N, N-diethyl-3-oxobutanamide, N, N-dibutyl-3-oxobutanamide, N,N-bis(2-ethylhexyl)-3-oxobutanamide, N,N-bis(2-methoxyethyl)-3-oxobutanamide, N,N-dibutyl-3-oxoheptanamide, N,N-bis(2-methoxyethyl)-3-oxoheptanamide, N,N-bis(2-ethylhexyl)-2-oxocyclopentanecarboxamide, N,N-dibutyl-3-oxo-3-phenylpropanamide or N,N-bis(2-methoxyethyl)-3-oxo-3-phenylpropanamide, or polyfunctional keto amides formed from the polyamidation of polyether amines with diketene or a 1,3-keto ester.

Suitable functional compounds having at least one cyanate group are especially cyanic esters of phenols or polyphenols, preferably phenyl cyanate, 2,2-bis(4-cyanatophenyl)propane (bisphenol A dicyanate), bis(4-cyanatophenyl)methane, bis(4-cyanato-3,5-dimethylphenyl)methane, 1,1-bis(4-cyanatophenyl)ethane, bis(4-cyanatophenyl)dicyclopentadiene, m-phenylene dicyanate, p-phenylene dicyanate, 4,4'-dicyanatodiphenyl sulfone, 1,3,5-tricyanatobenzene, novolak cyanates, cyanates of ester-modified bisphenols, especially of caprolactone-modified bisphenols, and polymers, having cyanate groups, of the polycyanates mentioned with polyols, especially polyether polyols or polyester polyols.

Suitable functional compounds having at least one isocyanate group are especially aliphatic or cycloaliphatic or aromatic monoisocyanates, preferably, butyl isocyanate, hexyl isocyanate, lauryl isocyanate, stearyl isocyanate, cyclohexyl isocyanate, allyl isocyanate or phenyl isocyanate, and also 3-isocyanatopropyltrimethoxysilane, 3-isocyanatopropyltriethoxysilane, 3-isocyanatopropyldimethoxymethylsilane or 3-isocyanatopropyldiethoxymethylsilane;

aliphatic or cycloaliphatic di- or triisocyanates, preferably tetramethylene 1,4-diisocyanate, 2-methylpentamethylene 1,5-diisocyanate, hexamethylene 1,6-diisocyanate (HDI), 2,2,4- and/or 2,4,4-trimethylhexamethylene 1,6-diisocyanate (TMDI), decamethylene 1,10-diisocyanate, dodecamethylene 1,12-diisocyanate, lysine diisocyanate or lysine ester diisocyanate, cyclohexane 1,3- or 1,4-diisocyanate, 1-methyl-2,4- and/or -2,6-diisocyanatocyclohexane (H$_6$TDI), 1-isocyanato-3,3,5-trimethyl-5-isocyanatomethylcyclohexane (IPDI), perhydro-2,4'- and/or -4,4'-diphenylmethane diisocyanate (H$_{12}$MDI), 1,3- or 1,4-bis-(isocyanatomethyl)-cyclohexane, m- or p-xylylene diisocyanate (m- or p-XDI), tetramethylxylylene 1,3- or 1,4-diisocyanate (m- or p-TMXDI), bis(1-isocyanato-1-methylethyl)naphthalene, dimer or trimer fatty acid isocyanates such as, in particular, 3,6-bis(9-isocyanatononyl)-4,5-di-(1-heptenyl)cyclohexene (dimeryl diisocyanate); more preferably HDI or IPDI;

aromatic di- or triisocyanates, preferably tolylene 2,4- and/or 2,6-diisocyanate (TDI), diphenylmethane 4,4'- and/or 2,4'- and/or 2,2'-diisocyanate (MDI), mixtures of MDI and MDI homologs (polymeric MDI or PMDI), phenylene 1,3- or 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris(isocyanatomethyl)benzene, tris(4-isocyanatophenyl)methane or tris(4-isocyanatophenyl) thiophosphate; more preferably MDI or TDI;

oligomers and derivatives of the di- and triisocyanates mentioned, preferably derived from HDI, IPDI, MDI or TDI. Especially suitable among these are commercially available types, preferably HDI biurets, HDI isocyanurates, HDI uretdiones, HDI iminooxadiazinediones, HDI allophanates, IPDI isocyanurates, TDI oligomers or mixed isocyanurates based on TDI/HDI, or room temperature liquid forms of MDI (called "modified MDI"), which are mixtures of MDI with MDI derivatives such as, in particular, MDI carbodiimides or MDI uretonimines or MDI urethanes, mixtures of MDI and MDI homologs (polymeric MDI or PMDI). In practice, oligomeric polyisocyanates of this kind are typically mixtures of substances having different degrees of oligomerization and/or chemical structures. They preferably have a mean NCO functionality of 2.1 to 4.0.

Polyurethane polymers containing isocyanate groups from the reaction of polyols, especially polyether polyols, with polyisocyanates, as described hereinafter.

Preferably, the functional compound having at least one isocyanate group has aliphatic isocyanate groups, especially derived from IPDI or HDI. These isocyanate groups have moderate reactivity, which facilitates the reaction with the amidine of the formula (I).

A suitable polyurethane polymer containing isocyanate groups is preferably obtained from the reaction of polyols with a superstoichiometric amount of polyisocyanates, especially diisocyanates. The reaction is preferably conducted with exclusion of moisture at a temperature in the range from 50° C. to 100° C., optionally in the presence of suitable catalysts. The excess of polyisocyanates is preferably chosen so as to leave, in the polyurethane polymer after the conversion of all hydroxyl groups, a content of free isocyanate groups in the range from 0.5% to 20% by weight, preferably 0.5% to 10% by weight, more preferably 0.5% to 5% by weight, based on the overall polymer.

A suitable polyurethane polymer containing isocyanate groups preferably has a mean molecular weight in the range from 500 to 20,000 g/mol.

Suitable polyisocyanates are especially diisocyanates, preferably hexamethylene 1,6-diisocyanate (HDI), 1-isocyanato-3,3,5-trimethyl-5-isocyanatomethylcyclohexane (isophorone diisocyanate or IPDI), tolylene 2,4- and/or 2,6-diisocyanate (TDI) or diphenylmethane 4,4'-, 2,4'- and/or 2,2'-diisocyanate (MDI).

Suitable polyols are especially polyether polyols, preferably polyoxyalkylene polyols, which are polymerization products of ethylene oxide or 1,2-propylene oxide or 1,2- or 2,3-butylene oxide or oxetanes or tetrahydrofuran or mixtures thereof, possibly polymerized with the aid of a starter molecule having two or more active hydrogen atoms; polyester polyols, preferably products from the polycondensation of diols or triols with lactones or dicarboxylic acids or esters or anhydrides thereof; polycarbonate polyols, OH-terminal block copolymers having at least two different blocks having polyether, polyester or polycarbonate units; polyacrylate polyols or polymethacrylate polyols; polyhydroxy-functional fats or oils, especially natural fats or oils; or polyhydrocarbon polyols, for example polyhydroxy-functional polyolefins. Further suitable polyols are di- or polyhydric alcohols of low molecular weight, such as ethane-1,2-diol, propane-1,2-diol, neopentyl glycol, dibromoneopentyl glycol, diethylene glycol, triethylene glycol, the isomeric dipropylene glycols or tripropylene glycols, the isomeric butanediols, pentanediols, hexanediols, heptanediol, octanediols, nonanediols, decanediols, undecanediol, cyclohexane-1,3- or -1,4-dimethanol, hydrogenated bisphenol A, dimer fatty acid alcohols, 1,1,1-trimethylolethane, 1,1,1-trimethylolpropane, glycerol, pentaerythritol, sugar alcohols or sugars, or low molecular weight alkoxylation products of the di- or polyhydric alcohols mentioned.

Also especially suitable are mixtures of the polyols mentioned.

Especially suitable are diols or triols or mixtures thereof.

Suitable functional compounds having at least one isothiocyanate group are especially methyl isothiocyanate, ethyl isothiocyanate, propyl isothiocyanate, isopropyl isothiocyanate, n-butyl isothiocyanate, 2-isothiocyanatobutane, cyclohexyl isothiocyanate, n-octyl isothiocyanate, allyl isothiocyanate, phenyl isothiocyanate, o- or m- or p-tolyl isothiocyanate, phenylene 1,2- or 1,3- or 1,4-diisothiocyanate or tolylene 2,4- and/or 2,6-diisothiocyanate.

Suitable functional compounds having at least one acrylate or methacrylate group are especially acrylic esters or methacrylic esters, preferably methyl (meth)acrylate, ethyl (meth)acrylate, butyl (meth)acrylate, 2-ethylhexyl (meth)acrylate, lauryl (meth)acrylate, stearyl (meth)acrylate, cyclohexyl (meth)acrylate, tetrahydrofuryl (meth)acrylate, isobornyl (meth)acrylate, 2-phenoxyethyl (meth)acrylate, 2-(2-phenoxyethoxy)ethyl (meth)acrylate, 2-(4-nonyl-phenoxy)ethyl (meth)acrylate, or 3-(meth)acryloyloxypropyltrimethoxysilane, 3-(meth)acryloyloxypropyltriethoxysilane, 3-(meth)acryloyloxypropyldimethoxymethylsilane or 3-(meth)acryloyloxypropyldiethoxymethylsilane;

di- or polyfunctional acrylates or methacrylates of aliphatic polyethers, polyesters, novolaks, phenols, aliphatic or cycloaliphatic alcohols, glycols, polyester glycols or mono- or polyalkoxylated derivatives of the aforementioned compounds, preferably ethylene glycol di(meth)acrylate, tetraethylene glycol di(meth)acrylate, tripropylene glycol di(meth)acrylate, polyethylene glycol di(meth)acrylate, polypropylene glycol di(meth)acrylate, butane-1,4-diol di(meth)acrylate, hexane-1,6-diol di(meth)acrylate, neopentyl glycol di(meth)acrylate, trimethylolpropane tri(meth)acrylate, pentaerythritol tetra(meth)acrylate, dipentaerythritol tetra(meth)acrylate, dipentaerythritol penta(meth)acrylate, dipentaerythritol hexa(meth)acrylate; di- or polyacryloyl- or -methacryloyl-functional polybutadienes, polyisoprenes or block copolymers thereof; adducts formed from di- or polyfunctional epoxides, such as those already mentioned, with acrylic acid or methacrylic acid; di- or polyfunctional polyurethane acrylates or methacrylates, especially reaction products of polyurethane polymers containing isocyanate groups with 2-hydroxyethyl acrylate; tris(2-hydroxyethyl) isocyanurate tri(meth)acrylate or tris(2-hydroxyethyl) cyanurate tri(meth)acrylate.

Suitable functional compounds having at least one acrylamide or methacrylamide group are especially acrylamide, methacrylamide or N-substituted acrylamides or methacrylamides, preferably N,N-dimethylacrylamide, N,N-diethylacrylamide, N-methylacrylamide, N-ethylacrylamide, N-propylacrylamide, N-isopropylacrylamide, N-butylacrylamide, N-tert-butylacrylamide, N,N-dimethylaminopropylacrylamide, N-hydroxymethylacrylamide, N-hydroxyethylacrylamide, N-hydroxypropylacrylamide, N-butoxymethylacrylamide, N-isobutoxymethylacrylamide or diacetoneacrylamide;

di- or polyfunctional acrylamides or methacrylamides, preferably N,N'-methylenebis(acrylamide), N,N'-ethylenebis(acrylamide) or N,N',N''-tris((meth)acryloyl)perhydrotriazine.

Suitable functional compounds having at least one acrylonitrile or methacrylonitrile group are especially acrylonitrile or methacrylonitrile.

Preference is given to acrylonitrile.

Suitable functional compounds having at least one maleate group are especially dialkyl maleates, preferably dimethyl maleate, diethyl maleate or dibutyl maleate.

Suitable functional compounds having at least one fumarate group are especially dialkyl fumarates, preferably dimethyl fumarate, diethyl fumarate or dibutyl fumarate.

Suitable functional compounds having at least one maleimide group are especially maleimide and N-alkylmaleimides, preferably N-methylmaleimide, N-ethylmaleimide, N-butylmaleimide, N-hexylmaleimide or 1,1-(1,6-hexylene)bis-(1H-pyrrole-2,5-dione).

Suitable functional compounds having at least one itaconate group are especially dialkyl itaconates, preferably dimethyl itaconate, diethyl itaconate, dibutyl itaconate or dihexyl itaconate.

More preferably, the functional compound is selected from the group consisting of 2-ethylhexyl glycidyl ether, $C_8$- to $C_{10}$-alkyl glycidyl ethers, $C_{12}$- to $C_{14}$-alkyl glycidyl ethers, cresyl glycidyl ether, tert-butylphenyl glycidyl ether, cardanol glycidyl ether, butane-1,4-diol diglycidyl ether, hexane-1,6-diol diglycidyl ether, neopentyl glycol diglycidyl ether, polypropylene glycol diglycidyl ether, bisphenol A diglycidyl ether, bisphenol F diglycidyl ether, 3-glycidoxypropyltrimethoxysilane, 3-glycidoxypropyltriethoxysilane, 1,2-propylene carbonate, succinic anhydride, maleic anhydride, hexahydrophthalic anhydride, phthalic anhydride, methyl caproate, ethyl caproate, methyl 2-ethylcaproate, ethyl 2-ethylcaproate, methyl laurate, ethyl laurate, methyl benzoate, ethyl benzoate, dimethyl adipate, diethyl adipate, dimethyl phthalate, diethyl phthalate, dimethyl isophthalate, diethyl isophthalate, dimethyl terephthalate, diethyl terephthalate, γ-butyrolactone, γ-valerolactone, δ-valerolactone, δ-caprolactone, ε-caprolactone, acetone, methyl ethyl ketone, methyl isopropyl ketone, methyl isobutyl ketone, cyclopentanone, cyclohexanone, acetophenone, hexane-2,5-dione, 2-methylpropanal, 2-ethylhexanal, dodecanal, benzaldehyde, 2,2-dimethyl-3-acetoxypropanal, 2,2-dimethyl-3-lauroyloxypropanal, 2,2-dimethyl-3-(N-morpholino)propanal, 3-bis(methoxyethyl)amino-2,2-dimethylpropanal, 3-bis(2-hydroxypropyl)amino-2,2-dimethylpropanal, terephthalaldehyde, pentane-2,4-dione, methyl acetoacetate, ethyl acetoacetate, isopropyl acetoacetate, tert-butyl acetoacetate, ethylene glycol bis(acetoacetate), propylene glycol bis(acetoacetate), diethylene glycol bis(acetoacetate), dipropylene glycol bis(acetoacetate), propane-1,3-diol bis(acetoacetate), butane-1,4-diol bis(acetoacetate), pentane-1,5-diol bis(acetoacetate), 3-methylpentane-1,5-diol bis(acetoacetate), hexane-1,6-diol bis(acetoacetate), 2,2(4),4-trimethyl-1,6-hexanediol bis(acetoacetate), N,N-dimethyl-3-oxobutanamide, N,N-diethyl-3-oxobutanamide, N,N-dibutyl-3-oxobutanamide, N,N-bis(2-ethylhexyl)-3-oxobutanamide, N,N-bis(2-methoxyethyl)-3-oxobutanamide, butyl isocyanate, hexyl isocyanate, lauryl isocyanate, stearyl isocyanate, cyclohexyl isocyanate, phenyl isocyanate, 3-isocyanatopropyltrimethoxysilane, 3-isocyanatopropyltriethoxysilane, polyurethane polymers containing isocyanate groups from the reaction of polyols with diisocyanates, methyl isothiocyanate, ethyl isothiocyanate, isopropyl isothiocyanate, butyl isothiocyanate, cyclohexyl isothiocyanate, phenyl isothiocyanate, butyl (meth)acrylate, 2-ethylhexyl (meth)acrylate, ethylene glycol di(meth)acrylate, tetraethylene glycol di(meth)acrylate, tripropylene glycol di(meth)acrylate, polyethylene glycol di(meth)acrylate, polypropylene glycol di(meth)acrylate, butane-1,4-diol di(meth)acrylate, hexane-1,6-diol di(meth)acrylate, neopentyl glycol di(meth)acrylate, trimethylolpropane tri(meth)acrylate, acrylonitrile, diethyl maleate, diethyl fumarate, N-ethylmaleimide and diethyl itaconate.

The reaction product of at least one amidine of the formula (I a) with at least one of the functional compounds described is preferably obtained by roughly stoichiometric use of the HX groups in relation to the reactive groups of the functional compound, as a result of which the reaction product obtained is substantially free of the reactive groups mentioned. The reaction can alternatively be conducted in sub- or superstoichiometric mode. Especially in the case of use of a functional compound containing more than one of the reactive groups mentioned, a substoichiometric conversion of the reactive groups may be advantageous since the reaction product, because of the reactive groups present, has an additional functionality that can serve, for example, for incorporation thereof into the polymer matrix or anchoring thereof onto a substrate or a filler.

A 1,3-diketone or 1,3-keto ester or 1,3-keto amide or (meth)acrylate or maleate or fumarate or itaconate group can react twice with HX groups. If the reaction is conducted in a stoichiometric manner in such a way that just one HX group is present per group of this kind, it is preferably condensed onto the keto group or added onto the double bond. If, by contrast, more than one HX group is present, a transesterification or amidation is additionally possible. Preferably, such a group is reacted just once.

The reaction is especially effected under conditions as typically used for reactions between the reactive groups involved in the particular reaction, preferably at a temperature in the range from 0° C. to 160° C. The reaction can be effected with use of a solvent or preferably in a solvent-free manner. It is optionally possible to also use auxiliaries, for example catalysts, initiators, desiccants or stabilizers.

The reaction product obtained from the process described is preferably used without workup or purification. If elimination products arise owing to condensation reactions in the conversion, these are preferably removed, especially by distillation, optionally under reduced pressure.

The reaction product of at least one amidine of the formula (I a) with at least one of the functional compounds described especially has the formula (III)

where
p is an integer from 1 to 6 and r is an integer from 0 to 5, where (p+r) is an integer from 1 to 6,
L is
a (p+r)-valent hydrocarbyl radical having a mean molecular weight in the range from 14 to 20,000 g/mol, optionally having heteroatoms, especially oxygen or nitrogen or silicon in the form of ether, tertiary amino, ester, amide, urethane, urea, uretdione, isocyanurate, biuret, allophanate, uretonimine, iminooxadiazinedione, oxadiazinetrione or alkoxysilane groups, or is a (p+r+1)-valent hydrocarbyl radical which, together with Q', forms an optionally substituted 5- or 6-membered ring,
or is a covalent bond,
or is a hydrogen radical,
Q is a reactive group selected from epoxide, aziridine, carbonate, carboxylic anhydride, carboxylic acid, carboxylic ester, lactone, carbonyl chloride, ketone, aldehyde, 1,3-diketone, 1,3-keto ester, 1,3-keto amide, cyanate, thiocyanate, isocyanate, isothiocyanate, (meth)acrylate, (meth)acrylamide, (meth)acrylonitrile, maleate, maleimide, maleimide, fumarate, fumaramide, itaconate, itaconamide, crotonate and crotonamide, and
Q' is a connecting unit formed from the reaction of Q with HX.

Q is preferably epoxide, carbonate, carboxylic anhydride, carboxylic ester, lactone, ketone, aldehyde, 1,3-diketone, 1,3-keto ester, 1,3-keto amide, cyanate, isocyanate, acrylate, methacrylate, acrylamide, methacrylamide, maleate, maleimide, fumarate or itaconate.

Q is more preferably epoxide, carbonate, carboxylic ester, lactone, ketone, aldehyde, 1,3-diketone, 1,3-keto ester, isocyanate, acrylate or methacrylate. The epoxide group is preferably a glycidyl group, especially a glycidyloxy group.

The aziridine group is preferably an N-aziridinyl group.

Preferably, Q' is selected from the group consisting of

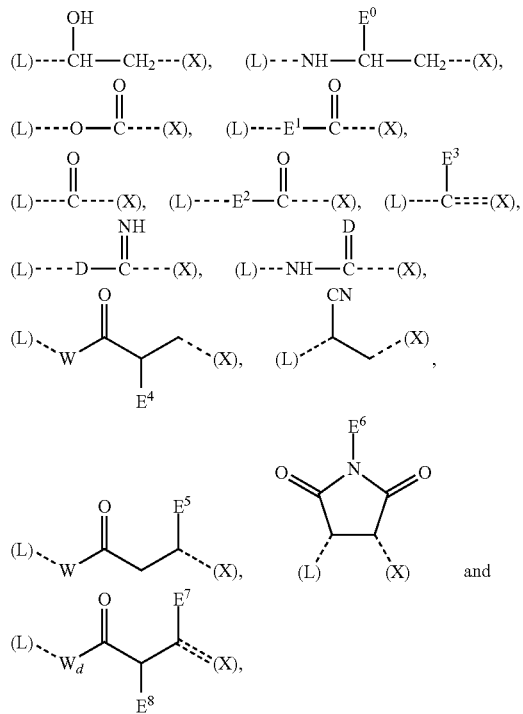

where
D is O or S,
W is O or $NR^{10}$ and $R^{10}$ is a hydrogen radical or is a monovalent hydrocarbyl radical having 1 to 8 carbon atoms,
$E^0$ is a hydrogen radical or is a methyl radical,
$E^1$ is a carboxyl-substituted alkylene, alkenediyl or phenylene radical having 2 to 8 carbon atoms,
$E^2$ is a hydroxyalkylene radical having 2 to 5 carbon atoms or is an O-bonded hydroxyalkyleneoxy radical having 2 or 3 carbon atoms,
$E^3$ is a hydrogen radical or is a monovalent hydrocarbyl radical having 1 to 6 carbon atoms, optionally having heteroatoms in the form of ether, ester, amino or amide groups, or together with L is an optionally substituted 1,4-butylene or 1,5-pentylene radical,
$E^4$ is a hydrogen or methyl or alkoxycarbonylmethyl radical having 2 to 9 carbon atoms,
$E^5$ is an alkoxycarbonyl radical having 1 to 8 carbon atoms or is a methyl radical,
$E^6$ is a hydrogen radical or is an alkyl radical having 1 to 8 carbon atoms,
$E^7$ is a monovalent hydrocarbyl radical having 1 to 6 carbon atoms,
$E^8$ is a hydrogen radical or is a monovalent hydrocarbyl radical having 1 to 6 carbon atoms, and
d is 0 or 1.

Preferably, D is O.
Preferably, W is O.

Preferably, $E^1$ is 2-carboxy-1,2-ethylene, 2-carboxy-1,2-ethenediyl, 3-carboxy-1,3-propylene, 2-carboxy-1,2-cyclohexylene or 2-carboxy-1,2-phenylene.

Preferably, $E^2$ is 1-hydroxy-1,2-ethylene, 1-hydroxy-1,3-propylene, 1-hydroxy-1,4-butylene, 1-hydroxy-1,5-pentylene, 2-hydroxy-1,2-ethyleneoxy or 3-hydroxy-1,3-propyleneoxy.

Preferably, $E^3$ is a hydrogen radical or is a methyl radical.

Preferably, $E^4$ is a hydrogen radical or is methyl, methoxycarbonylmethyl, ethoxycarbonylmethyl or butoxycarbonylmethyl, and is especially a hydrogen radical or a methyl radical.

Preferably, $E^5$ is methoxycarbonyl, ethoxycarbonyl or butoxycarbonyl or is methyl.

Preferably, $E^6$ is a hydrogen radical or methyl, ethyl or butyl.

Preferably, $E^7$ is methyl.
Preferably, $E^8$ is a hydrogen radical.
Preferably, p is 1 or 2 or 3.
Preferably, r is 0.
Preferably, (p+r) is 1 or 2 or 3.
More preferably, p is 1 or 2 or 3 and r is 0.

In a preferred reaction product of the formula (III), p is $p^1$, r is 0, X is $X^2$, Q' is

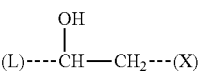

and L is $L^1$. This therefore has the formula (III a)

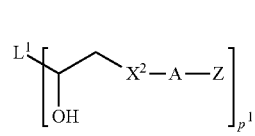

(III a)

where
$p^1$ is an integer from 1 to 4,
$L^1$ is a $p^1$-valent hydrocarbyl radical having a mean molecular weight in the range from 15 to 1,500 g/mol, especially having one or more ether groups and optionally an alkoxysilane group,
$X^2$ is S or $NR^7$,
and A, $R^7$ and Z have the definitions described.

Preferably, $p^1$ is 1 or 2 or 3, more preferably 1 or 2.
Preferably, $X^2$ is $NR^7$.

A reaction product of the formula (III a) is especially obtained from the reaction of at least one amidine of the formula (I a) in which X is $X^2$ with at least one of the described functional compounds having at least one epoxide group. The reaction is preferably conducted at a temperature in the range from 20° C. to 140° C., especially 40° C. to 120° C.

In a further preferred reaction product of the formula (III), p is $p^2$, r is 0, X is $X^1$, Q' is

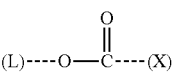

and L is $L^2$. This therefore has the formula (III b)

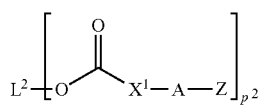
(III b)

where
$p^2$ is 1 or 2,
$X^1$ is O or $NR^7$,
$L^2$ is an alkyl radical having 1 to 18 carbon atoms,
and A, $R^7$ and Z have the definitions described.

Preferably, $p^2$ is 1.

Preferably, $L^2$ has a molecular weight in the range from 45 to 185 g/mol.

Preferably, $L^2$ is a hydroxyalkyl radical having 2 to 8 carbon atoms.

More preferably, $L^2$ is 2-hydroxyethyl, 2-hydroxypropyl or 3-hydroxypropyl, especially 2-hydroxypropyl.

A reaction product of the formula (III b) is especially obtained from the reaction of at least one amidine of the formula (I a) in which X is O or $NR^7$ with at least one dialkyl carbonate. The reaction is preferably conducted at a temperature in the range from 20° C. to 140° C., especially 40° C. to 120° C., and alcohols or phenols released are preferably removed during or after the reaction, especially by distillation under reduced pressure.

In a further preferred reaction product of the formula (III), p is $p^3$, r is 0, X is $X^1$, Q' is

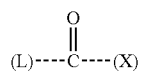

and L is $L^3$. This therefore has the formula (III c)

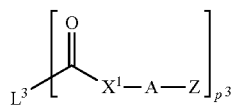
(III c)

where
$p^3$ is 1 or 2 or 3,
$X^1$ is O or $NR^7$,
$L^3$ is a covalent bond or is a hydrogen radical or is a $p^3$-valent hydrocarbyl radical having a mean molecular weight in the range from 14 to 500 g/mol, optionally having unsaturated components and optionally ether groups or ester groups,
and A, $R^7$ and Z have the definitions described.

Preferably, $p^3$ is 1 or 2, especially 1.

A reaction product of the formula (III c) is especially obtained from the reaction of at least one amidine of the formula (I a) in which X is O or is $NR^7$ with at least one of the described functional compounds having at least one carboxylic ester group. The reaction is preferably conducted at a temperature in the range from 20° C. to 160° C., especially 40° C. to 140° C. The elimination products formed in the reaction, in the form of alcohols or phenols, are preferably removed during or after the reaction, especially by distillation under reduced pressure.

In a further preferred reaction product of the formula (III), p is 1, r is 0, X is $X^1$, Q' is

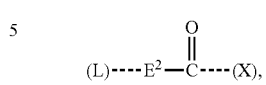

$E^2$ is $CH(OH)—(CH_2)_b$ or is $CH(OH)—(CH_2)_cO$ and L is $L^4$. This therefore has the formula (III d) or (III e)

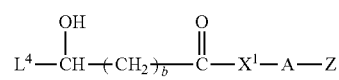
(III d)

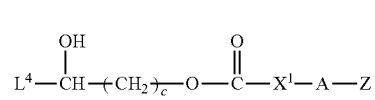
(III e)

where
$X^1$ is O or $NR^7$,
b is an integer in the range from 1 to 4,
c is 1 or 2,
$L^4$ is a hydrogen radical or is a linear alkyl radical having 1 to 12 carbon atoms, and A, $R^7$ and Z have the definitions described.

Preferably, b is 2 or 3 or 4.

Preferably, c is 1.

In the case of formula (III d), $L^4$ is preferably a hydrogen radical or a linear alkyl radical having 1 to 8 carbon atoms, and is especially a hydrogen radical or a methyl radical.

In the case of formula (III e), $L^4$ is preferably a hydrogen radical or a methyl radical, especially a methyl radical.

A reaction product of the formula (III d) is especially obtained from the reaction of at least one amidine of the formula (I a) in which X is O or $NR^7$ with at least one of the lactones described.

A reaction product of the formula (III e) is especially obtained from the reaction of at least one amidine of the formula (I a) in which X is O or $NR^7$ with at least one of the cyclic carbonates described.

The reaction is preferably conducted at a temperature in the range from 20° C. to 140° C., especially 40° C. to 120° C.

In a further preferred reaction product of the formula (III), p is $p^5$, r is 0, X is NH, Q' is

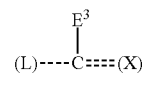

and L is $L^5$. This therefore has the formula (III f)

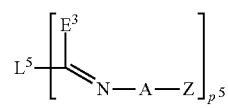
(III f)

where
$p^5$ is 1 or 2 or 3,
$L^5$ is a monovalent hydrocarbyl radical having 1 to 20 carbon atoms, optionally containing heteroatoms, especially oxygen or nitrogen in the form of ester groups, amide groups, ether groups or tertiary amino groups, or together with $E^3$ is an optionally substituted 1,4-butylene or 1,5-pentylene radical, and A and Z have the definitions described.

Preferably, $p^5$ is 1 or 2, especially 1.

Preferably, $E^3$ is a hydrogen radical or a methyl radical.

If $E^3$ is a hydrogen radical, $L^5$ is preferably prop-2-yl, hept-3-yl, undec-1-yl, phenyl, 1,1-dimethyl-2-acetoxyeth-1-yl, 1,1-dimethyl-2-lauroyloxyeth-1-yl, 1,1-dimethyl-2-(N-morpholino)eth-1-yl, 2-bis(methoxyethyl)amino-1,1-dimethyleth-1-yl or 2-bis(2-hydroxypropyl)amino-1,1-dimethyleth-1-yl.

If $E^3$ is a methyl radical, $L^5$ is preferably methyl, ethyl, prop-2-yl, 2-methylprop-1-yl, benzyl.

A reaction product of the formula (III f) is especially obtained from the reaction of at least one amidine of the formula (I a) in which X is NH with at least one of the described functional compounds having at least one ketone or aldehyde group. The reaction is preferably conducted at a temperature in the range from 0° C. to 120° C., especially 20° C. to 100° C. The water formed in the reaction is preferably removed during or after the reaction, especially by azeotropic distillation or distillation under reduced pressure.

In a further preferred reaction product of the formula (III), p is $p^6$, r is 0, X is $X^1$, Q' is

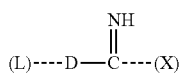

and L is $L^6$. This therefore has the formula (III g)

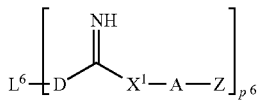

(III g)

where $p^6$ is an integer from 1 to 3, $X^1$ is O or $NR^7$, $L^6$ is a $p^6$-valent hydrocarbyl radical having a mean molecular weight in the range from 77 to 5,000 g/mol, optionally having heteroatoms, especially oxygen in the form of ether groups or ester groups, or fluorine atoms, and D, A, $R^7$ and Z have the definitions described.

Preferably, $p^6$ is 2 or 3, especially 2.

A reaction product of the formula (III g) is especially obtained from the reaction of at least one amidine of the formula (I a) in which X is O or $NR^7$ with at least one of the described functional compounds having at least one cyanate or thiocyanate group. The reaction is preferably conducted at a temperature in the range from 20° C. to 150° C.

In a further preferred reaction product of the formula (III), p is $p^7$, r is 0, X is $X^1$, Q' is

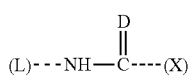

and L is $L^7$. This therefore has the formula (III h)

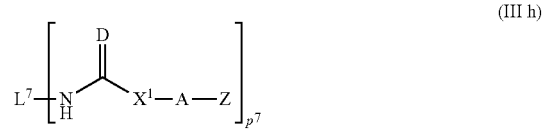

(III h)

where $p^7$ is an integer from 1 to 4, $X^1$ is O or $NR^7$, $L^7$ is a $p^7$-valent hydrocarbyl radical having a mean molecular weight in the range from 15 to 20,000 g/mol, optionally containing heteroatoms, especially in the form of ether groups, ester groups, amide groups, urethane groups, isocyanurate groups, cyanurate groups, isocyanate groups or alkoxysilane groups, and D, A, $R^7$ and Z have the definitions described.

Preferably, $p^7$ is 1 or 2 or 3.

A reaction product of the formula (III h) is especially obtained from the reaction of at least one amidine of the formula (I a) in which X is O or $NR^7$ with at least one of the described functional compounds having at least one isocyanate or isothiocyanate group. The reaction is preferably conducted at a temperature in the range from 0° C. to 120° C. If X is $NR^7$ preference is given to a temperature in the range from 0° C. to 80° C. If X is O, preference is given to a temperature in the range from 40° C. to 120° C.

In a further preferred reaction product of the formula (III), p is $p^8$, r is 0, X is $NR^7$, Q' is

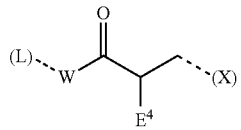

and L is $L^8$. This therefore has the formula (III i)

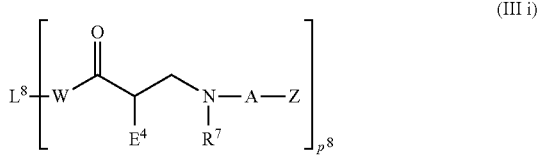

(III i)

where $p^8$ is an integer from 1 to 3, $L^8$ is a hydrogen radical or a $p^8$-valent hydrocarbyl radical having a mean molecular weight in the range from 14 to 20,000 g/mol, optionally containing heteroatoms, especially in the form of ether groups, ester groups, urethane groups, isocyanurate groups, cyanurate groups or alkoxysilane groups, and W, $E^4$, A, $R^7$ and Z have the definitions described.

Preferably, $p^8$ is 1 or 2, especially 1.

A reaction product of the formula (III i) is especially obtained from the reaction of at least one amidine of the formula (I a) in which X is $NR^7$ with at least one of the described functional compounds having at least one acrylate, methacrylate, acrylamide, methacrylamide, fumarate, fumaramide, itaconate or itaconamide group. The reaction is preferably conducted at a temperature in the range from 0° C. to 140° C., especially 20° C. to 120° C.

In a further preferred reaction product of the formula (III), p is $p^9$, r is 0, X is NH, Q' is

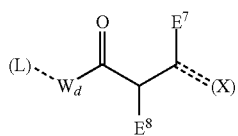

and L is $L^9$. This therefore has the formula (III j)

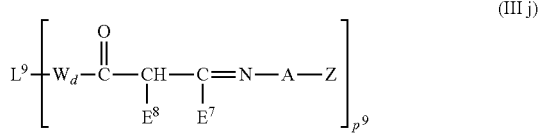

where
$p^9$ is 1 or 2 or 3,
$L^9$ is a $p^9$-valent hydrocarbyl radical having a mean molecular weight in the range from 15 to 5,000 g/mol, optionally containing heteroatoms, especially in the form of ether groups, ester groups,
and d, W, $E^7$, $E^8$, A and Z have the definitions described.

Preferably, $p^9$ is 1 or 2, especially 1.

A reaction product of the formula (III j) is especially obtained from the reaction of at least one amidine of the formula (I a) in which X is NH with at least one of the described functional compounds having at least one 1,3-diketone or 1,3-keto ester or 1,3-keto amide group. The reaction is preferably conducted at a temperature in the range from 0° C. to 120° C., especially 20° C. to 100° C. The water formed in the reaction is preferably removed during or after the reaction, especially by azeotropic distillation or distillation under reduced pressure.

The preferred reaction products of the formula (III) are preparable from readily obtainable starting materials in a simple process.

A reaction product of the formula (III) or of the formula (III a) or (III b) or (III c) or (III d) or (III e) or (III f) or (III g) or (III h) or (III i) or (III j) may also be in tautomeric form. All possible tautomer forms of these reaction products are considered to be equivalent within the context of the present invention. In addition, these reaction products may be in protonated form. These reaction products may likewise be in complexed form, especially with cations of zinc, iron or molybdenum.

A reaction product of the formula (III) can also be obtained by reacting, in a first step, an amine of the formula (II a) or (II b) in which Y is HX with one of the functional compounds described, with reaction of at least one of the reactive groups thereof with the HX group to give an amine intermediate, and reaction thereof in a second step with the reagent for introduction of amidine groups. This preparation is especially suitable for amines in which X is NH and $R^1$ is a hydrogen radical, i.e. for polyamines having two primary amino groups. The first step is preferably conducted here such that the primary amino groups of the amine are present in a stoichiometric excess over the reactive groups of the functional compound, so as to form an amine intermediate having a primary amino group.

The reaction conditions for the reagents involved in the particular reactions here are preferably the same as already described.

The amidine of the formula (I) and/or a reaction product thereof as described above, especially a reaction product of the formula (III), is used as catalyst for the crosslinking of a composition based on polymers containing silane groups, where it accelerates the crosslinking or curing of the composition.

The polymer containing silane groups is especially selected from the group consisting of polyorganosiloxanes having terminal silane groups and organic polymers containing silane groups, as described more specifically hereinafter.

A polyorganosiloxane having terminal silane groups has the advantage that, in the cured state, it is particularly water- and light-stable and enables particularly flexible properties.

An organic polymer containing silane groups has the advantage of having particularly good adhesion properties on a multitude of substrates and being particularly inexpensive.

The invention thus further provides a composition comprising at least one amidine of the formula (I) and/or at least one reaction product as described above, and at least one polymer containing silane groups. The reaction product here is especially a reaction product of the formula (III).

Such a composition typically has good storability with no propensity to separation, and because of the low toxicity and low volatility of the amidine of the formula (I) allows a low hazard classification and enables low-emissions and low-odor products that cure rapidly and at the same time form a mechanically high-quality and durable material. A particularly advantageous circumstance here is that this material shows barely any propensity to migration-related defects such as sweating or substrate soiling, by contrast with compositions comprising catalysts according to the prior art, for example DBU or TMG. Compositions comprising such catalysts known from the prior art have a propensity to migration effects, which can be manifested prior to curing by separation and after curing by tacky and/or greasy surfaces and/or substrate soiling. Particularly the latter effects are extremely undesirable, since tacky and greasy surfaces are rapidly soiled and are difficult to paint over, and substrate contaminants can lead to lasting discoloration.

In a preferred embodiment, the polymer containing silane groups is a polyorganosiloxane having terminal silane groups.

A preferred polyorganosiloxane having terminal silane groups has the formula (IV)

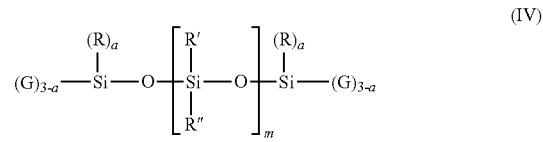

where
R, R' and R'' are each independently a monovalent hydrocarbyl radical having 1 to 12 carbon atoms;
G is a hydroxyl radical or an alkoxy, acetoxy, ketoximato, amido or enoxy radical having 1 to 13 carbon atoms;
a is 0, 1 or 2; and
m is an integer in the range from 50 to about 2,500.

R is preferably methyl, vinyl or phenyl.

R' and R'' are preferably each independently an alkyl radical having 1 to 5, preferably 1 to 3, carbon atoms, especially methyl.

G is preferably a hydroxyl radical or an alkoxy or ketoximato radical having 1 to 6 carbon atoms, especially a hydroxyl, methoxy, ethoxy, methylethylketoximato or methylisobutylketoximato radical.

More preferably, G is a hydroxyl radical.

a is preferably 0 or 1, especially 0.

In addition, m is preferably chosen such that the polyorganosiloxane of the formula (IV) has a viscosity at room temperature in the range from 100 to 500,000 mPa·s, especially from 1000 to 100,000 mPa·s.

Polyorganosiloxanes of the formula (IV) are easy to handle and crosslink with moisture and/or silane crosslinkers to give solid silicone polymers having elastic properties.

Suitable commercially available polyorganosiloxanes of the formula (IV) are available, for example, from Wacker, Momentive Performance Material, GE Advanced Materials, Dow Corning, Bayer or Shin Etsu.

Preferably, the composition comprises, in addition to the polyorganosiloxane having terminal silane groups, a silane crosslinker, especially a silane of the formula (V),

$(R''')_q—Si-(G')_{4-q}$     (V)

where

R''' is a monovalent hydrocarbyl radical having 1 to 12 carbon atoms,

G' is a hydroxyl radical or is an alkoxy, acetoxy, ketoximato, amido or enoxy radical having 1 to 13 carbon atoms; and q has a value of 0, 1 or 2, especially 0 or 1.

Particularly suitable silanes of the formula (V) are methyltrimethoxysilane, ethyltrimethoxysilane, propyltrimethoxysilane, vinyltrimethoxysilane, methyltriethoxysilane, vinyltriethoxysilane, phenyltriethoxysilane, tetramethoxysilane, tetraethoxysilane, methyltris(methylethylketoximo)silane, vinyltris(methylethylketoximo)silane and methyltris(isobutylketoximo)silane.

In a further preferred embodiment, the polymer containing silane groups is an organic polymer containing silane groups, especially a polyolefin, polyester, polyamide, poly(meth)acrylate or polyether or a mixed form of these polymers, each of which bears one or preferably more than one silane group. The silane groups may be in pendant positions in the chain or in terminal positions and are bonded to the organic polymer via a carbon atom.

More preferably, the organic polymer containing silane groups is a polyolefin containing silane groups or a polyester containing silane groups or a poly(meth)acrylate containing silane groups or a polyether containing silane groups or a mixed form of these polymers.

Most preferably, the organic polymer containing silane groups is a polyether containing silane groups.

The silane groups present in the organic polymer containing silane groups are preferably alkoxysilane groups, especially alkoxysilane groups of the formula (VI)

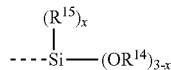

$$\begin{matrix}(R^{15})_x\\ |\\ ----Si—(OR^{14})_{3-x}\end{matrix}$$     (VI)

where $R^{14}$ is a linear or branched, monovalent hydrocarbyl radical having 1 to 5 carbon atoms, especially methyl or ethyl or isopropyl;

$R^{15}$ is a linear or branched, monovalent hydrocarbyl radical having 1 to 8 carbon atoms, especially methyl or ethyl; and x is a value of 0 or 1 or 2, preferably 0 or 1, especially 0.

More preferably $R^{14}$ is methyl or ethyl.

For particular applications, the $R^{14}$ radical is preferably an ethyl group, since, in this case, ecologically and toxicologically harmless ethanol is released in the course of curing of the composition.

Particular preference is given to trimethoxysilane groups, dimethoxymethylsilane groups or triethoxysilane groups.

In this context, methoxysilane groups have the advantage that they are particularly reactive, and ethoxysilane groups have the advantage that they are toxicologically advantageous and particularly storage-stable.

The organic polymer containing silane groups has an average of preferably 1.3 to 4, especially 1.5 to 3, more preferably 1.7 to 2.8, silane groups per molecule. The silane groups are preferably terminal.

The organic polymer containing silane groups preferably has a mean molecular weight, determined by means of GPC against a polystyrene standard, in the range from 1,000 to 30,000 g/mol, especially from 2,000 to 20,000 g/mol. The organic polymer containing silane groups preferably has a silane equivalent weight of 300 to 25,000 g/eq, especially of 500 to 15,000 g/eq.

The organic polymer containing silane groups may be solid or liquid at room temperature. It is preferably liquid at room temperature.

Most preferably, the organic polymer containing silane groups is a polymer containing silane groups which is liquid at room temperature, where the silane groups are especially dialkoxysilane groups and/or trialkoxysilane groups, more preferably trimethoxysilane groups or triethoxysilane groups.

Processes for preparing polyethers containing silane groups are known to the person skilled in the art.

In a preferred process, polyethers containing silane groups are obtainable from the reaction of polyethers containing allyl groups with hydrosilanes, optionally with chain extension using, for example, diisocyanates.

In a further preferred process, polyethers containing silane groups are obtainable from the copolymerization of alkylene oxides and epoxysilanes, optionally with chain extension using, for example, diisocyanates.

In a further preferred process, polyethers containing silane groups are obtainable from the reaction of polyether polyols with isocyanatosilanes, optionally with chain extension using diisocyanates.

In a further preferred process, polyethers containing silane groups are obtainable from the reaction of polyethers containing isocyanate groups, especially NCO-terminated urethane polyethers from the reaction of polyether polyols with a superstoichiometric amount of polyisocyanates, with aminosilanes, hydroxysilanes or mercaptosilanes. Polyethers containing silane groups from this process are particularly preferred. This process enables the use of a multitude of inexpensive starting materials of good commercial availability, by means of which it is possible to obtain different polymer properties, for example high extensibility, high strength, low modulus of elasticity, low glass transition point or high weathering resistance.

More preferably, the polyether containing silane groups is obtainable from the reaction of NCO-terminated urethane polyethers with aminosilanes or hydroxysilanes. Suitable NCO-terminated urethane polyethers are obtainable from the reaction of polyether polyols, especially polyoxyalkylenediols or polyoxyalkylenetriols, preferably polyoxypropylenediols or polyoxypropylenetriols, with a superstoichiometric amount of polyisocyanates, especially diisocyanates.

Preferably, the reaction between the polyisocyanate and the polyether polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups of 0.1% to 5% by weight, preferably 0.2% to 4% by weight, more preferably 0.3% to 3% by weight, based on the overall polymer, remains in the resulting urethane polyether after the reaction of all hydroxyl groups. Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and a mean molecular weight in the range from 400 to 25,000 g/mol, especially 1000 to 20,000 g/mol.

As well as polyether polyols, it is also possible to use portions of other polyols, especially polyacrylate polyols, and low molecular weight diols or triols.

Suitable aminosilanes for the reaction with an NCO-terminated urethane polyether are primary and secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane, 3-aminopropyldimethoxymethylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Aminosilanes suitable for the purpose are especially 3-aminopropyltrimethoxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3,3-dimethylbutyltrimethoxysilane or 4-amino-3,3-dimethylbutyltriethoxysilane.

Suitable lactones are especially γ-valerolactone, γ-octalactone, δ-decalactone, and ε-decalactone, especially γ-valerolactone.

Suitable cyclic carbonates are especially 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6-diphenyl-1,4-dioxane-2,5-dione (lactide formed from mandelic acid).

Preferred hydroxysilanes which are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide and N-(3-triethoxysilylpropyl)-2-hydroxypropyl carbamate.

In addition, suitable hydroxysilanes are also obtainable from the addition of aminosilanes onto epoxides or from the addition of amines onto epoxysilanes. Preferred hydroxysilanes which are obtained in this way are 2-morpholino-4(5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

Further suitable polyethers containing silane groups are commercially available products, especially the following: MS Polymer™ (from Kaneka Corp.; especially the S203H, S303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35 products).

Particularly preferred organic polymers containing silane groups have end groups of the formula (VII)

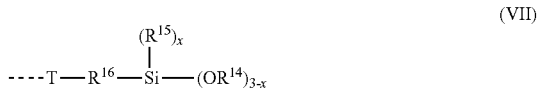

(VII)

where $R^{16}$ is a linear or branched divalent hydrocarbyl radical which has 1 to 12 carbon atoms and optionally has cyclic and/or aromatic moieties and optionally one or more heteroatoms, especially one or more nitrogen atoms;

T is a divalent radical selected from —O—, —S—, —N($R^{17}$)—, —O—CO—N($R^{17}$)—, —N($R^{17}$)—CO—O— and —N($R^{17}$)—CO—N($R^{17}$)—, where $R^{17}$ is a hydrogen radical or a linear or branched hydrocarbyl radical which has 1 to 20 carbon atoms and optionally has cyclic moieties, and which optionally has an alkoxysilane, ether or carboxylic ester group; and $R^{14}$, $R^{15}$ and x have the definitions already given.

Preferably, $R^{16}$ is 1,3-propylene or 1,4-butylene, where butylene may be substituted by one or two methyl groups.

More preferably, $R^{16}$ is 1,3-propylene.

Preferably, the amidine of the formula (I) or the reaction product is present in the composition in such an amount that the concentration of amidine groups from the amidine of the formula (I) and/or the reaction product, based on the amount of the crosslinkable polymer, is in the range from 0.2 to 20 mmol/100 g of polymer, preferably 0.2 to 15 mmol/100 g of polymer, especially 0.5 to 10 mmol/100 g.

Such a composition has good storability and rapid curing.

In addition to the amidine of the formula (I) or to the reaction product, the composition may comprise further catalysts, especially for the crosslinking of silane groups. Suitable further catalysts are especially metal compounds and/or basic nitrogen or phosphorus compounds.

Suitable metal compounds are especially compounds of tin, titanium, zirconium, aluminum or zinc, especially diorganotin(IV) compounds such as, in particular, dibutyltin(IV) diacetate, dibutyltin(IV) dilaurate, dibutyltin(IV) dineodecanoate or dibutyltin(IV) bis(acetylacetonate) and dioctyltin(IV) dilaurate, and also titanium(IV) or zirconium(IV) or aluminum(III) or zinc(II) complexes, especially with alkoxy, carboxylate, 1,3-diketonate, 1,3-ketoesterate or 1,3-ketoamidate ligands.

Suitable basic nitrogen or phosphorus compounds are especially imidazoles, pyridines, phosphazene bases or preferably amines, hexahydrotriazines, biguanides, guanidines or further amidines.

Suitable amines are especially alkyl-, cycloalkyl- or aralkylamines such as triethylamine, triisopropylamine, 1-butylamine, 2-butylamine, tert-butylamine, 3-methyl-1-butylamine, 3-methyl-2-butylamine, dibutylamine, tributylamine, hexylamine, dihexylamine, cyclohexylamine, dicyclohexylamine, dimethylcyclohexylamine, benzylamine, dibenzylamine, dimethylbenzylamine, octylamine, 2-ethylhexylamine, di-(2-ethylhexyl)amine, laurylamine, N,N-dimethyllaurylamine, stearylamine, N,N-dimethylstearylamine; fatty amines derived from natural fatty acid mixtures, such as, more particularly, cocoalkylamine, N,N-dimethylcocoalkylamine, $C_{16-22}$-alkylamine, N,N-dimethyl-$C_{16-22}$-alkylamine, soyaalkylamine, N,N-dimethylsoyaalkylamine, oleylamine, N,N-dimethyloleylamine, tallowalkylamine or N,N-dimethyltallowalkylamine, obtainable, for example, under the Armeen® (from Akzo Nobel) or Rofamin® (from Ecogreen Oleochemicals) trade names; aliphatic, cycloaliphatic or araliphatic diamines such as ethylenediamine, butanediamine, hexamethylenediamine, dodecanediamine, neopentanediamine, 2-methyl-pentamethylenediamine (MPMD), 2,2(4),4-trimethylhexamethylenediamine (TMD), isophoronediamine (IPD), 2,5(2,6)-bis-(aminomethyl)bicyclo[2.2.1]-heptane (NBDA), 1,3-xylylenediamine (MXDA), N,N'-di(tert-butyl)ethylenediamine, N,N,N',N'-tetramethylethylenediamine, N,N,N',N'-tetramethylpropylenediamine, N,N,N',N'-tetramethylhexamethylenediamine, 3-dimethyl-aminopropylamine, 3-(methylamino)propylamine, 3-(cyclohexylamino)propylamine, piperazine, N-methylpiperazine, N,N'-dimethylpiperazine, 1,4-diazabicyclo[2.2.2]octane, fatty polyamines such as N-cocoalkyl-1,3-propanediamine, N-oleyl-1,3-propanediamine, N-soyaalkyl-1,3-propanediamine, N-tallowalkyl-1,3-propanediamine or N—($C_{16-22}$-alkyl)-1,3-propanediamine, obtainable, for example, under the Duomeen® trade name (from Akzo Nobel); polyalkyleneamines such as diethylenetriamine, dipropylenetriamine, triethylenetetramine (TETA), tetraethylenepentamine (TEPA), pentamethylenehexamine (PEHA), 3-(2-aminoethyl)aminopropylamine, N,N'-bis(3-aminopropyl)ethylenediamine, N-(3-aminopropyl)-N-methylpropanediamine, bis(3-dimethylaminopropyl)amine, N-(3-dimethylaminopropyl)-1,3-propylenediamine, N-(2-aminoethyl)piperazine (N-AEP), N-(2-aminopropyl)piperazine, N,N'-di-(2-aminoethyl)piperazine, 1-methyl-4-(2-dimethylaminoethyl)piperazine, N,N,N',N'',N''-pentamethyldiethylenetriamine, N,N,N',N'',N''-pentamethyldipropylenetriamine, polyethyleneimines, obtainable, for example, under the Lupasol® (from BASF) and Epomin® (from Nippon Shokubai) trade names; etheramines such as, more particularly, 2-methoxyethylamine, 2-ethoxyethylamine, 3-methoxypropylamine, 3-ethoxypropylamine, 3-(2-ethylhexyloxy)propylamine, 3-(2-methoxyethoxy)propylamine, 2(4)-methoxyphenylethylamine, morpholine, N-methylmorpholine, N-ethylmorpholine, 2-aminoethylmorpholine, bis(2-aminoethyl) ether, bis(dimethylaminoethyl) ether, bis(dimorpholinoethyl) ether, N,N,N'-trimethyl-N'-hydroxyethylbis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or 2-aminopropyl-terminated glycols as obtainable, for example, under the Jeffamine® trade name (from Huntsman); amino alcohols such as, more particularly, ethanolamine, isopropanolamine, diethanolamine, diisopropanolamine, triethanolamine, triisopropanolamine, N-butylethanolamine, diglycolamine, N,N-diethylethanolamine, N-methyldiethanolamine, N-methyldiisopropylamine, N,N,N'-trimethylaminoethylethanolamine, N-(3-dimethylaminopropyl)-N, N-diisopropanolamine, N,N-bis(3-dimethylaminopropyl)-N-isopropanolamine, 2-(2-dimethylaminoethoxy)ethanolamine or adducts formed from mono- and polyamines with epoxides or diepoxides; amines containing phenol groups, such as, more particularly, condensation products formed from phenols, aldehydes and amines (what are called Mannich bases and phenalkamines), such as, more particularly, 2-(dimethylaminomethyl)phenol, 2,4,6-tris(dimethylaminomethyl)phenol or polymers formed from phenol, formaldehyde and N,N-dimethyl-1,3-propanediamine, and also phenalkamines commercially available under the Cardolite® (from Cardolite), Aradur® (from Huntsman) and Beckopox® (from Cytec) brand names; polyamines containing amide groups, called polyamidoamines, as commercially available, for example, under the Versamid® (from Cognis), Aradur® (from Huntsman), Euretek® (from Huntsman) or Beckopox® (from Cytec) brand names; or aminosilanes such as, more particularly 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine or analogs thereof with ethoxy in place of the methoxy groups on the silicon.

Suitable hexahydrotriazines are especially 1,3,5-hexahydrotriazine or 1,3,5-tris(3-(dimethylamino)propyl)hexahydrotriazine.

Suitable biguanides are especially biguanide, 1-butylbiguanide, 1,1-dimethylbiguanide, 1-butylbiguanide, 1-phenylbiguanide or 1-(o-tolyl)biguanide (OTBG).

Suitable guanidines are especially 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl)

propyl)-1,1,3,3-tetramethylguanidine, 2-(3-(triethoxysilyl)propyl)-1,1,3,3-tetramethylguanidine, 1,5,7-triazabicyclo[4.4.0]dec-5-ene (TBD), 7-methyl-1,5,7-triazabicyclo[4.4.0]dec-5-ene, 7-cyclohexyl-1,5,7-triazabicyclo[4.4.0]dec-5-ene, 1-phenylguanidine, 1-(o-tolyl)guanidine (OTG), 1,3-diphenylguanidine, 1,3-di(o-tolyl)guanidine or 2-guanidinobenzimidazole.

Suitable further amidines are especially 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydropyrimidine, N-(3-trimethoxysilylpropyl)-4,5-dihydroimidazole or N-(3-triethoxysilylpropyl)-4,5-dihydroimidazole.

In addition, the composition may comprise, as cocatalyst, an acid, especially a carboxylic acid. Preference is given to aliphatic carboxylic acids such as formic acid, lauric acid, stearic acid, isostearic acid, oleic acid, 2-ethyl-2,5-dimethylcaproic acid, 2-ethylhexanoic acid, neodecanoic acid, fatty acid mixtures from the hydrolysis of natural fats and oils or di- and polycarboxylic acids, especially poly(meth)acrylic acids.

In a preferred embodiment, the composition is essentially free of organotin compounds. Organotin-free compositions are advantageous in terms of protection of health and protection of the environment. More particularly, the tin content of the curable composition is less than 0.1% by weight, especially less than 0.05% by weight.

In a further preferred embodiment, the composition comprises a combination of at least one amidine of the formula (I) and/or at least one reaction product thereof as described above and at least one organotin compound, especially a diorganotin(IV) compound such as those mentioned above. Such a composition already has a high curing rate coupled with a low tin content, which is advantageous for toxicological and environmental reasons.

In one embodiment, the composition additionally comprises, as well as the catalyst described, at least one organotitanate. A combination of the catalyst described and an organotitanate has particularly high catalytic activity. This enables rapid curing of such a composition with a comparatively small use amount of organotitanate.

Suitable organotitanates are especially titanium(IV) complexes.

Preferred organotitanates are especially selected from
titanium(IV) complexes having two 1,3-diketonate ligands, especially 2,4-pentanedionate (=acetylacetonate), and two alkoxide ligands;
titanium(IV) complexes having two 1,3-ketoesterate ligands, especially ethylacetoacetate, and two alkoxide ligands;
titanium(IV) complexes having one or more aminoalkoxide ligands, especially triethanolamine or 2-((2-aminoethyl)amino)ethanol, and one or more alkoxide ligands;
titanium(IV) complexes having four alkoxide ligands;
and more highly condensed organotitanates, especially oligomeric titanium(IV) tetrabutoxide, also referred to as polybutyl titanate;
where suitable alkoxide ligands are especially isobutoxy, n-butoxy, isopropoxy, ethoxy and 2-ethylhexoxy.

Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Very particularly suitable organotitanates are selected from bis(ethylacetoacetato)diisobutoxytitanium(IV) (commercially available, for example, as Tyzor® IBAY from Dorf Ketal), bis(ethylacetoacetato)diisopropoxytitanium(IV) (commercially available, for example, as Tyzor® DC from Dorf Ketal), bis(acetylacetonato)diisopropoxytitanium(IV), bis(acetylacetonato)diisobutoxytitanium(IV), tris(oxyethyl)amine-isopropoxy-titanium(IV), bis[tris(oxyethyl)amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxy)-diethoxytitanium(IV), titanium(IV) tetrabutoxide, tetra(2-ethylhexyloxy) titanate, tetra(isopropoxy) titanate and polybutyl titanate.

Most preferred are bis(ethylacetoacetato)diisobutoxytitanium(IV) or bis(ethylacetoacetato)diisopropoxytitanium(IV).

The composition may comprise further constituents, especially the following auxiliaries and additives:
adhesion promoters and/or crosslinkers, especially aminosilanes such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl]ethylenediamine or the analogs thereof with ethoxy in place of methoxy groups, and also N-phenyl-, N-cyclohexyl- or N-alkylaminosilanes, mercaptosilanes, epoxysilanes, (meth)acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, especially amino-functional methylsilsesquioxane or amino-functional propylsilsesquioxane. Especially suitable are 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, 3-glycidoxypropyltrimethoxysilane, 3-glycidoxypropyltriethoxysilane or 3-ureidopropyltrimethoxysilane, or oligomeric forms of these silanes;
desiccants, especially tetraethoxysilane, vinyltrimethoxysilane, vinyltriethoxysilane or organoalkoxysilanes having a functional group in the α position to the silane group, especially N-(methyldimethoxysilylmethyl)-O-methylcarbamate, (methacryloyloxymethyl)silanes, methoxymethylsilanes, orthoformic esters, calcium oxide or molecular sieves, especially vinyltrimethoxysilane or vinyltriethoxysilane;
plasticizers, especially trialkylsilyl-terminated polydialkylsiloxanes, preferably trimethylsilyl-terminated polydimethylsiloxanes, especially having viscosities in the range from 10 to 1,000 mPa·s, or corresponding compounds in which some of the methyl groups have been replaced by other organic groups, especially phenyl, vinyl or trifluoropropyl groups, called reactive plasticizers, in the form of monofunctional polysiloxanes, i.e. those that are reactive at one end, carboxylic esters such as phthalates, especially dioctyl phthalate, bis(2-ethylhexyl) phthalate, bis(3-propylheptyl) phthalate, diisononyl phthalate or diisodecyl phthalate, diesters of ortho-cyclohexane-dicarboxylic acid, especially diisononyl 1,2-cyclohexanedicarboxylate, adipates, especially dioctyl adipate, bis(2-ethylhexyl) adipate, azelates, especially bis(2-ethylhexyl) azelate, sebacates, especially bis(2-ethylhexyl) sebacate or diisononyl sebacate, polyols, especially polyoxyalkylene polyols or polyester polyols, glycol ethers, glycol esters, organic phosphoric or sulfonic esters, sulfonamides, polybutenes, or fatty acid methyl or ethyl esters derived from natural fats or oils, also called "biodiesel", plasticizers containing siloxane groups being particularly suitable for polymers containing silane groups in the form of polyorganosiloxanes;

solvents;

inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres;

fibers, especially glass fibers, carbon fibers, metal fibers, ceramic fibers or polymer fibers such as polyamide fibers or polyethylene fibers;

dyes;

pigments, especially titanium dioxide or iron oxides;

rheology modifiers, especially thickeners, especially sheet silicates such as bentonites, derivatives of castor oil, hydrogenated castor oil, polyamides, polyurethanes, urea compounds, fumed silicas, cellulose ethers or hydrophobically modified polyoxyethylenes;

stabilizers against oxidation, heat, light or UV radiation;

natural resins, fats or oils such as rosin, shellac, linseed oil, castor oil or soya oil;

non-reactive polymers such as, in particular, homo- or copolymers of unsaturated monomers, especially from the group comprising ethylene, propylene, butylene, isobutylene, isoprene, vinyl acetate or alkyl (meth) acrylates, especially polyethylenes (PE), polypropylenes (PP), polyisobutylenes, ethylene-vinyl acetate copolymers (EVA) or atactic poly-α-olefins (APAO);

flame-retardant substances, especially the already mentioned fillers aluminum hydroxide and magnesium hydroxide, or, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis (diphenyl phosphate) or ammonium polyphosphates;

surface-active substances, especially wetting agents, leveling agents, deaerating agents or defoamers;

biocides, especially algicides, fungicides or substances that inhibit fungal growth;

and other substances customarily used in curable compositions. It may be advisable to chemically or physically dry certain constituents before mixing them into the composition.

In a preferred embodiment, the composition comprises at least one desiccant and at least one adhesion promoter and/or crosslinker.

In a preferred embodiment, the composition does not comprise any phthalates as plasticizers. Such compositions are toxicologically advantageous and have fewer problems with migration effects.

The composition is preferably produced and stored with exclusion of moisture. Typically, it is storage-stable with exclusion of moisture in a suitable package or arrangement, such as, more particularly, a bottle, a canister, a pouch, a bucket, a vat or a cartridge.

The composition may take the form of a one-component or of a multicomponent, especially two-component, composition.

In the present document, "one-component" refers to a composition in which all constituents of the composition are stored in a mixture in the same container and which is curable with moisture.

In the present document, "two-component" refers to a composition in which the constituents of the composition are present in two different components which are stored in separate containers. Only shortly before or during the application of the composition are the two components mixed with one another, whereupon the mixed composition cures, optionally under the action of moisture.

If the composition comprises a polyorganosiloxane having terminal silane groups, preference is given either to a one-component composition, also referred to as RTV-1, or to a two-component composition, also referred to as RTV-2. In the case of an RTV-2 composition, the polyorganosiloxane having terminal silane groups is preferably a constituent of the first component, and a silane crosslinker, especially a silane crosslinker of the formula (VI), is preferably a constituent of the second component. The amidine of the formula (I) or a reaction product thereof may be present in the first and/or the second component.

If the composition comprises an organic polymer containing silane groups, the composition is preferably a one-component composition.

Any second or optionally further components is/are mixed with the first component prior to or on application, especially by means of a static mixer or by means of a dynamic mixer.

The composition is especially applied at ambient temperature, preferably within a temperature range between 0° C. and 45° C., especially 5° C. to 35° C., and cures under these conditions.

On application, the crosslinking reaction of the silane groups commences, if appropriate under the influence of moisture. Silane groups present can condense with silanol groups present to give siloxane groups (Si—O—Si groups). Silane groups present can also be hydrolyzed on contact with moisture to give silanol groups (Si—OH groups) and form siloxane groups (Si—O—Si groups) through subsequent condensation reactions. As a result of these reactions, the composition ultimately cures. The amidine of the formula (I) or a reaction product thereof accelerates this curing.

If water is required for the curing, this can either come from the air (air humidity), or else the composition can be contacted with a water-containing component, for example by painting, for example with a smoothing agent, or by spraying, or water or a water-containing component can be added to the composition on application, for example in the form of a water-containing or water-releasing liquid or paste. A paste is especially suitable if the composition itself is in the form of a paste.

In the case of curing by means of air humidity, the composition cures from the outside inward, at first forming a skin on the surface of the composition. What is called the skin time is a measure of the curing rate of the composition. The speed of curing is generally determined by various factors, for example the availability of water, temperature, etc.

The composition is suitable for a multitude of uses, especially as a paint, varnish or primer, as a resin for production of fiber composites, as a rigid foam, flexible foam, molding, elastomer, fiber, film or membrane, as a potting compound, sealant, adhesive, covering, coating or paint for construction and industrial applications, for example as a seam seal, cavity seal, electrical insulation compound, spackling compound, joint sealant, weld or crimp seam sealant, assembly adhesive, bodywork adhesive, glazing adhesive, sandwich element adhesive, laminating adhesive, laminate adhesive, packaging adhesive, wood adhesive, parquet adhesive, anchoring adhesive, floor covering, floor coating, balcony coating, roof coating, concrete protection coating, parking garage coating, seal, pipe coating, anticorrosion coating, textile coating, damping element, sealing element or spackling compound. The composition is particularly suitable as an adhesive and/or sealant, especially for joint sealing and for elastic adhesive bonds in construction and industrial applications, and as elastic coating with crack-bridging properties, especially for protection and/or sealing of, for example, roofs, floors, balconies, parking decks or concrete pipes.

The composition is thus preferably an adhesive or a sealant or a coating.

A composition of this kind typically comprises plasticizers, fillers, adhesion promoters and/or crosslinkers and desiccants, and optionally further auxiliaries and additives.

For an application as adhesive or sealant, the composition preferably has a pasty consistency with structurally viscous properties. Such a pasty sealant or adhesive is especially applied to a substrate from standard cartridges which are operated manually, by means of compressed air or with a battery, or from a vat or hobbock by means of a delivery pump or an extruder, optionally by means of an application robot.

For an application as coating, the composition preferably has a liquid consistency at room temperature with self-leveling properties. It may be slightly thixotropic, such that the coating is applicable to sloping to vertical surfaces without flowing away immediately. It is especially applied by means of a roller or brush or by pouring-out and distribution by means, for example, of a roller, a scraper or a notched trowel.

On application, the composition is preferably applied to at least one substrate. Suitable substrates are especially glass, glass ceramic, concrete, mortar, brick, tile, gypsum and natural rocks such as limestone, granite or marble;

metals and alloys such as aluminum, iron, steel and nonferrous metals, and also surface-finished metals and alloys such as galvanized or chromed metals;

leather, textiles, paper, wood, woodbase materials bonded with resins, for example phenolic, melamine or epoxy resins, resin-textile composites and further polymer composites;

plastics such as polyvinyl chloride (rigid and flexible PVC), acrylonitrilebutadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), and also fiber-reinforced plastics such as carbon fiber-reinforced plastics (CFP), glass fiber-reinforced plastics (GFP) and sheet molding compounds (SMC), where the plastics may preferably have been surface-treated by means of plasma, corona or flames;

coated substrates such as powder-coated metals or alloys;

paints or varnishes, especially automotive topcoats.

If required, the substrates can be pretreated prior to the application of the composition, especially by chemical and/or physical cleaning methods or by the application of an adhesion promoter, an adhesion promoter solution or a primer.

The composition is particularly suitable for contact with substrates that are particularly sensitive to defects caused by migrating substances, especially by the formation of discoloration or specks. These are, in particular, fine-pore substrates such as marble, limestone or other natural stones, gypsum, cement mortar or concrete, but also plastics. Especially on PVC, severe discoloration is observed in the presence of catalysts, for example DBU or TMG, and cannot be removed by cleaning. No such effects are observed with the amidine of the formula (I) or a reaction product thereof.

It is possible to bond or seal two identical or two different substrates, especially the aforementioned substrates.

After the curing of the composition with water, especially in the form of air humidity, and/or with at least one suitable crosslinker, a cured composition is obtained.

The use of the composition gives rise to an article which especially has been bonded, sealed or coated with the composition. The article is especially a built structure, especially a structure built by structural engineering or civil engineering, an industrially manufactured good or a consumable good, especially a window, a domestic appliance or a mode of transport such as, more particularly, an automobile, a bus, a truck, a rail vehicle, a ship, an aircraft or a helicopter; or the article may be an installable component thereof.

EXAMPLES

Adduced hereinafter are working examples which are intended to elucidate the invention described in detail. It will be appreciated that the invention is not restricted to these described working examples.

"Standard climatic conditions" refer to a temperature of 23±1° C. and a relative air humidity of 50±5%.

"EEW" stands for epoxy equivalent weight.

$^1$H NMR spectra were measured on a spectrometer of the Bruker Ascend 400 type at 400.14 MHz; the chemical shifts δ are reported in ppm relative to tetramethylsilane (TMS). Coupling constants J are reported in Hz. No distinction was made between true coupling and pseudo-coupling patterns.

Infrared spectra (FT-IR) were measured on a Nicolet iS5 FT-IR instrument from Thermo Scientific equipped with a horizontal ATR measurement unit with a diamond crystal. Liquid samples were applied undiluted as films; solid samples were dissolved in $CH_2Cl_2$. The absorption bands are reported in wavenumbers ($cm^{-1}$) (measurement window: 4000-650 $cm^{-1}$).

Gas chromatograms (GC) were measured within the temperature range of 60 to 320° C. with a heating rate of 15° C./min and a run time of 10 min at 320° C.

The injector temperature was 250° C. A Zebron ZB-5 column was used (L=30 m, ID=0.25 mm, dj=0.5 μm) with a gas flow rate of 1.5 ml/min. Detection was effected by means of flame ionization (FID), with evaluation of the signals via the area percent method.

The skin time (ST) was determined by applying a few grams of the composition to cardboard in a layer thickness of about 2 mm and measuring, under standard climatic conditions, the time until, when the surface of the composition was gently tapped by means of an LDPE pipette, no residues remained any longer on the pipette for the first time.

The characteristics of the surface were tested by touch.

The mechanical properties of tensile strength, elongation at break and modulus of elasticity (at 0-5% and at 0-50% elongation) were measured in accordance with DIN EN 53504 at a pulling speed of 200 mm/min.

Viscosities were measured on a thermostated Rheotec RC30 cone-plate viscometer (cone diameter 50 mm, cone angle 1°, cone tip-plate distance 0.05 mm, shear rate 10 s$^{-1}$).

Reagent Used for Introduction of Amidine Groups:
trimethyl orthoacetate (Sigma-Aldrich)
Functional Compounds Used:
diethyl adipate (Sigma-Aldrich)
tert-butyl acrylate (Sigma-Aldrich)
tetrahydrofurfuryl methacrylate (Sigma-Aldrich)
ethyl acrylate (Sigma-Aldrich)
trimethylolpropane triacrylate (Sigma-Aldrich)
Preparation of Amidines of the Formula (I):

Amidine A1: 1-(2-hydroxyethyl)-2-methyl-1,4,5,6-tetrahydropyrimidine

In a round-bottom flask, 11.91 g of N-(3-aminopropyl)-2-aminoethanol, 15.94 g of trimethyl orthoacetate and 0.32 g of lanthanum(III) trifluoromethanesulfonate were heated to 120° C. while stirring for 24 hours. Thereafter, the reaction mixture was freed of the volatile constituents under reduced pressure and the residue was distilled under reduced pressure. This gave 14.44 g of a colorless low-odor oil having a boiling temperature of 130 to 135° C. at 0.1 mbar, which, according to the GC spectrum, contained a content of 98% of amidine A1 and, when left to stand at room temperature, crystallized to give a white solid.

$^1$H NMR (CDCl$_3$): δ 1.83 (quint., 2 H, J=5.6, NCH$_2$CH$_2$CH$_2$N), 2.02 (s, 3 H, CH$_3$), 3.24 (t, 2 H, J=5.8, NCH$_2$CH$_2$OH), 3.31 (m, 4 H, NCH$_2$CH$_2$CH$_2$N), 3.69 (t, 2 H, J=5.7, NCH$_2$CH$_2$OH).

FT-IR: 3214, 3177, 2996, 2925, 2843, 1630, 1542, 1475, 1438, 1380, 1360, 1322, 1294, 1273, 1204, 1191, 1139, 1114, 1095, 1035, 1009, 977, 915, 875, 839, 731.

Amidine A2: 1-(3-aminopropyl)-2-methyl-1,4,5,6-tetrahydropyrimidine

In a round-bottom flask, 62.97 g of trimethyl orthoacetate, 62.12 g of bis(3-aminopropyl)amine (Baxxodur® EC 110, from BASF) and 2.80 g of lanthanum(III) trifluoromethanesulfonate were mixed and the mixture was heated under reflux to 120° C. while stirring for 3 days. Thereafter, the reaction mixture was freed of the volatile constituents under reduced pressure and the residue was distilled under reduced pressure. This gave 26.65 g of a colorless oil having a boiling temperature of 85-88° C. at 0.1 mbar, which, according to GC spectrum, contained a content of 87% of amidine A2.

$^1$H NMR (CDCl$_3$) (signals from amidine A2 only): δ 1.05 (s, 2 H, NH$_2$), 1.57-1.70 (m, 2 H, CH$_2$CH$_2$NH$_2$), 1.74-1.86 (m, 2 H, C=NCH$_2$CH$_2$), 1.97 (s, 3 H, CH$_3$), 2.60-2.80 (m, 2 H, CH$_2$CH$_2$NH$_2$), 3.10-3.24 and 3.25-3.34 (2H×m, 2×2 H, CH$_2$N).

FT-IR: 3260, 2924, 2748, 1611, 1482, 1433, 1375, 1353, 1317, 1289, 1211, 1149, 1126, 1099, 1085, 1031, 1014, 942, 879, 821, 752, 735, 692.

Amidine A3: 1-(3-dimethylaminopropyl)-2-methyl-1,4,5,6-tetrahydropyrimidine

To an initial charge of 131.63 g of ethyl acetoacetate in 50 ml of toluene in a round-bottom flask were gradually added dropwise, while stirring and cooling, 161.09 g of N$^1$-((3-dimethylamino)propyl)-1,3-diaminopropane (from BASF), in the course of which the temperature was kept at 20 to 30° C. Thereafter, the azeotrope of toluene and water was removed from the reaction mixture by means of distillation at 40° C. and 10 mbar and then the remaining toluene and ethyl acetate were removed by means of distillation under standard pressure and the residue was distilled under reduced pressure. This gave 168.74 g of a yellowish oil having a boiling temperature of 95-105° C. at 0.6 mbar.

$^1$H NMR (CDCl$_3$) (signals from amidine A3 only): δ 1.6-1.7 (m, 2 H, NCH$_2$CH$_2$CH$_2$N(CH$_3$)$_2$), 1.75-1.85 (m, 2 H, C=NCH$_2$CH$_2$), 2.00 (s, 3 H, N=C—CH$_3$), 2.19 (s, 6 H, N(CH$_3$)$_2$), 2.18-2.26 (m, 2 H, CH$_2$N(CH$_3$)$_2$), 3.11-3.20 (m, 4 H, NCH$_2$), 3.26-3.35 (t, 2 H, J=5.7, NCH$_2$).

FT-IR: 3233, 2937, 2854, 2814, 2763, 1615, 1459, 1419, 1375, 1351, 1317, 1294, 1260, 1230, 1208, 1152, 1118, 1097, 1085, 1040, 1013, 969, 940, 887, 871, 841, 763, 731.

Preparation of Reaction Products:

Amidine U1: Reaction Product Comprising 2-(2-methyl-1,4,5,6-tetrahydropyrimidin-1-yl)ethyl ethyl adipate In a round-bottom flask, 3.22 g of the amidine A1 prepared above were mixed with 4.62 g of diethyl adipate, the mixture was heated to 100° C. and ethanol was distilled off at 100 mbar for 5 hours. Then the reaction mixture was concentrated fully on a rotary evaporator at 120° C. and 10 mbar. This gave 5.81 g of an orange, low-odor oil.

$^1$H NMR (CDCl$_3$): δ 1.25 (t, 3 H, J=7.2, OCH$_2$CH$_3$), 1.62-1.69 (m, 4 H, CH$_2$CH$_2$C(O)O), 1.75-1.85 (m, 2 H, C=NCH$_2$CH$_2$), 1.98 (s, 3 H, N=CCH$_3$), 2.28-2.37 (m, 4 H, CH$_2$C(O)O), 3.20-3.37 (m, 4 H, CH$_2$N), 3.41 (t, 2 H, J=5.8, NCH$_2$CH$_2$O), 4.12 (q, 2 H, J=7.2, OCH$_2$CH$_3$), 4.14-4.20 (m, 2 H, J=5.8, NCH$_2$CH$_2$O).

FT-IR: 2629, 2852, 1730, 1316, 1482, 1421, 1376, 1317, 1242, 1209, 1170, 1140, 1087, 1075, 1030, 1012, 941, 882, 856, 752.

Amidine U2: Reaction product comprising tert-butyl 3-(3-(2-methyl-1,4,5,6-tetrahydropyrimidin-1-yl)propylamino)propionate In a round-bottom flask, 2.05 g of the amidine A2 prepared above were mixed with 1.74 g of tert-butyl acrylate and the mixture was heated to 100° C. while stirring until, after 3 hours, no tert-butyl acrylate was detectable any longer by means of gas chromatography. Thereafter, the reaction mixture was freed of the volatile constituents under reduced pressure. This gave 3.76 g of a colorless, low-odor oil.

$^1$H NMR (CDCl$_3$): δ 1.44 (s, 9 H, tert-BuO), 1.61-1.73 (m, 2 H, CH$_2$CH$_2$NH), 1.77-1.86 (m, 2 H, C=NCH$_2$CH$_2$), 1.98 (s, 3 H, N=CCH$_3$), 2.41 (t, 2 H, J=6.4, CH$_2$C(O)O), 2.57-2.64 and 2.78-2.86 (2×m, 2×2 H, CH$_2$NHCH$_2$), 3.12-3.24 (m, 4 H, CH$_2$N), 3.27-3.33 (m, 2 H, CH$_2$N).

FT-IR: 3255, 2974, 2926, 2846, 1723, 1616, 1480, 1456, 1420, 1391, 1366, 1317, 1290, 1248, 1228, 1154, 1039, 1014, 942, 879, 846, 754.

Amidine U3: Reaction product comprising tetrahydrofurfuryl 3-(3-(2-methyl-1,4,5,6-tetrahydropyrimidin-1-yl)propylamino)-2-methylpropionate In a round-bottom flask, 2.22 g of the amidine A2 prepared above were mixed with 2.60 g of tetrahydrofurfuryl methacrylate and the mixture was heated to 100° C. while stirring until, after 3 hours, no tetrahydrofurfuryl methacrylate was detectable any longer by means of gas chromatography. Thereafter, the reaction mixture was freed of the volatile constituents under reduced pressure. This gave 4.65 g of a yellow, low-odor oil.

$^1$H NMR (CDCl$_3$): δ 1.17 (s, 3 H, CH$_3$CHC(O)O), 1.56-1.71 (m, 4 H, CH$_2$CH$_2$NH and CH$_2$-THF), 1.75-1.85 (m, 2 H, N—CH$_2$—CH$_2$—CH$_2$—N), 1.85-1.93 (m, 1 H, CH—C(O)O)), 1.97 (s, 5 H, N=CCH$_3$ and THF), 2.5-2.9 (m, 4 H, CH$_2$NHCH$_2$), 3.10-3.25 (m, 4 H, CH$_2$N), 3.27-3.33 (m, 2 H, CH$_2$N), 3.78 (q, 1 H, J=7.1, THF), 3.87 (q, 1H, J=7.3, THF), 3.99-4.20 (m, 3H, THF).

FT-IR: 3265, 2928, 2851, 1730, 1614, 1459, 1422, 1376, 1353, 1318, 1291, 1208, 1175, 1130, 1083, 1018, 994, 920, 879, 816, 756.

Amidine U4: Reaction Product Comprising ethyl 3-(3-(2-methyl-1,4,5,6-tetrahydropyrimidin-1-yl)propylamino)propionate In a round-bottom flask, 2.75 g of the amidine A2 prepared above were mixed with 1.70 g of ethyl acrylate and the mixture was heated to 100° C. while stirring until, after 4 hours, no ethyl acrylate was detectable any longer by means of gas chromatography. This gave a yellow, low-odor oil.

FT-IR: 3159, 2930, 2849, 1730, 1612, 1455, 1429, 1378, 1357, 1319, 1293, 1255, 1206, 1177, 1128, 1046, 1032, 986, 946, 882, 833, 741, 696.

Amidine U5: Reaction product comprising trimethylolpropane tris(7-(2-methyl-1,4,5,6-tetrahydropyrimidin-1-yl)-4-azaheptanoate)

In a round-bottom flask, 3.76 g of the amidine A2 prepared above were mixed with 2.33 g of trimethylolpropane triacrylate and the mixture was heated to 50° C. while stirring until, after 1.5 hours, no trimethylolpropane triacrylate was detectable any longer by means of gas chromatography. This gave a yellow, low-odor oil.

FT-IR: 2926, 2849, 1732, 1661, 1610, 1429, 1377, 1357, 1318, 1292, 1252, 1209, 1173, 1125, 1087, 1045, 1031, 947, 883, 837, 776, 740, 697.

Preparation of a Polyether Containing Silane Groups:
Polymer STP-1:

With exclusion of moisture, 1000 g of Acclaim® 12200 polyol (polyoxypropylenediol having a low level of unsaturation, from Bayer; OH number 11.0 mg KOH/g), 43.6 g of isophorone diisocyanate (IPDI; Vestanat® IPDI, from Evonik), 126.4 g of diisodecyl phthalate (DIDP) and 0.1 g of bismuth tris(neodecanoate) (10% by weight in DIDP) were heated up to 90° C. while stirring constantly and left at this temperature until the content of free isocyanate groups determined by titrimetry had reached a stable value of 0.63% by weight. Subsequently, 63.0 g of diethyl N-(3-trimethoxysilylpropyl)aminosuccinate (adduct formed from 3-aminopropyltrimethoxysilane and diethyl maleate; prepared according to the details in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained, having a silane equivalent weight of about 6880 g/eq (calculated from the amounts used), was cooled down to room temperature and stored with exclusion of moisture.

Commercial Catalysts Used and Abbreviations Therefor:

DBU 1,8-diazabicyclo[5.4.0]undec-7-ene (Lupragen® N 700, from BASF)

TMG 1,1,3,3-tetramethylguanidine (from Sigma-Aldrich)

IBAY bis(ethylacetoacetato)diisobutoxytitanium(IV) (Tyzor® IBAY, from Dorf Ketal)

Compositions Based on Polymers Containing Silane Groups:

Comparative examples are identified in tables 1 and 2 by "(Ref)".

Compositions Z1 to Z8:

A composition composed of 96.5 g of polymer STP-1, 0.5 g of vinyltrimethoxysilane and 3.0 g of 3-aminopropyltrimethoxysilane was mixed with various catalysts in the amounts specified according to table 1, and the mixture was tested for viscosity and skin time (ST) under standard climatic conditions, before and after storage. The skin time serves as a measure of the activity of the catalyst in relation to the crosslinking reaction of the silane groups, i.e. of the crosslinking rate; the change in viscosity and the skin time after storage are a measure of storage stability. In addition, the mixture applied, after 24 hours under standard climatic conditions, was tested as to whether the surface was dry as desired or whether a greasy film had formed, which is a sign of the exudation of the catalyst owing to poor compatibility with the cured polymer, and/or whether the surface was tacky, which is a sign of incomplete curing. In addition, the mixture was used to produce a film of thickness 2 mm, which was left to cure under standard climatic conditions for 7 days and tested for mechanical properties. The results are shown in tables 1 and 2. "Comp." stands for "composition".

TABLE 1

| Comp. | Catalyst | Amount | Concentration[1] | Viscosity [Pa · s] fresh | stored[2] | increase | ST fresh | stored[2] |
|---|---|---|---|---|---|---|---|---|
| Z1 | Amidine A1 | 0.26 g | 1.90 | 22.2 | 25.0 | 13% | 79' | 62' |
| Z2 | Amidine A2 | 0.29 g | 1.90 | 21.2 | 26.1 | 23% | 28' | 26' |
| Z3 | Amidine A3 | 0.34 g | 1.90 | 21.3 | 22.2 | 4% | 31' | 32' |
| Z4 | Amidine U1 | 0.55 g | 1.90 | 21.9 | 29.8 | 36% | 26' | 32' |
| Z5 | Amidine U2 | 0.52 g | 1.90 | 20.3 | 24.8 | 22% | 20' | 28' |
| Z6 | Amidine U3 | 0.60 g | 1.90 | 22.1 | 25.3 | 15% | 20' | 27' |
| Z7 | Amidine U4 | 0.52 g | 1.90 | 28.9 | 33.7 | 17% | 20' | 25' |
| Z8 | Amidine U5 | 0.48 g | 1.90 | 30.4 | 36.8 | 21% | 32' | 36' |

TABLE 1-continued

| Comp. | Catalyst | Amount | Concentration[1] | Viscosity [Pa · s] fresh | Viscosity [Pa · s] stored[2] | Viscosity [Pa · s] increase | ST fresh | ST stored[2] |
|---|---|---|---|---|---|---|---|---|
| Z9 (Ref) | DBU | 0.28 g | 1.90 | 27.2 | 36.9 | 36% | 25' | 29' |
| Z10 (Ref) | TMG | 0.21 g | 1.90 | 22.3 | 24.6 | 10% | 65' | 75' |

[1]mmol of amidine or guanidine groups per 100 g of polyether containing silane groups.
[2]for 7 days at 60° C. in a closed container.

TABLE 2

| Comp. | Surface after 24 h | Tensile strength | Elongation at break | Modulus of elasticity 0-5% | Modulus of elasticity 0-50% |
|---|---|---|---|---|---|
| Z1 | dry | 0.75 MPa | 99% | 0.99 MPa | 0.77 MPa |
| Z2 | almost dry | 0.69 MPa | 102% | 1.16 MPa | 0.77 MPa |
| Z3 | almost dry | 0.62 MPa | 78% | 1.22 MPa | 0.84 MPa |
| Z4 | dry | 0.73 MPa | 109% | 1.20 MPa | 0.79 MPa |
| Z5 | dry | 0.71 MPa | 103% | 1.17 MPa | 0.80 MPa |
| Z6 | almost dry | 0.69 MPa | 99% | 1.25 MPa | 0.80 MPa |
| Z7 | almost dry | 0.74 MPa | 111% | 1.21 MPa | 0.81 MPa |
| Z8 | dry | 0.79 MPa | 127% | 1.17 MPa | 0.79 MPa |
| Z9 (Ref) | greasy | 0.58 MPa | 72% | 1.16 MPa | 0.77 MPa |
| Z10 (Ref) | tacky | 0.62 MPa | 90% | 1.19 MPa | 0.75 MPa |

The invention claimed is:

1. A method of catalyzing hydrolysis or condensation or both of a polymer containing silane groups, comprising contacting a catalyst with the polymer containing silane groups, wherein:
the catalyst comprises at least one amidine of the formula (I)

where
A is a divalent hydrocarbyl radical which has 2 to 30 carbon atoms and optionally contains unsaturated components and optionally ether oxygen or secondary or tertiary amine nitrogen,
Y is $NR^8R^9$ where $R^8$ and $R^9$ are independently an alkyl radical having 1 to 8 carbon atoms, or together are an optionally substituted alkylene radical having 4 to 10 carbon atoms, and
Z is an amidine group bonded via a nitrogen atom,
where Y and Z are separated from one another by at least two carbon atoms, and/or
at least one reaction product of at least one amidine of the formula (I) with at least one functional compound,
wherein A is not a polyoxyalkylene radical and wherein the amidine of the formula (I) does not contain any nitrogen atom which is directly bonded to an aromatic ring or is part of a heteroaromatic ring system.

2. The method as claimed in claim 1, wherein Z is

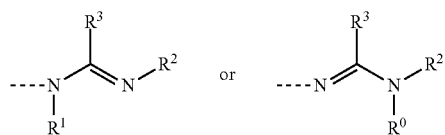

where
$R^0$ is a hydrogen radical or is an alkyl or cycloalkyl or aralkyl radical having 1 to 8 carbon atoms, $R^1$ is a hydrogen radical or is an alkyl or cycloalkyl or aralkyl radical having 1 to 8 carbon atoms or together with $R^2$ is $R^4$,
$R^2$ is a hydrogen radical or is an alkyl, cycloalkyl or aralkyl radical which has 1 to 18 carbon atoms and optionally contains heteroatoms, or together with $R^1$ is $R^4$,
$R^3$ is a hydrogen radical or is an alkyl or cycloalkyl or aralkyl radical having 1 to 12 carbon atoms, and
$R^4$ is 1,2-ethylene or 1,2-propylene or 1,3-propylene or 1,3-butylene or 1,3-pentylene,
where
$R^0$ and $R^2$ together may also be an alkylene radical which has 3 to 6 carbon atoms and may optionally contain ether oxygen or tertiary amine nitrogen, and
$R^2$ and $R^3$ together may also be an alkylene radical having 3 to 6 carbon atoms.

3. The method as claimed in claim 2, wherein Z is

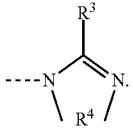

4. The method as claimed in claim 1, wherein A is selected from the group consisting of 1,2-ethylene, 1,3-propylene, 1,2-propylene, 1,3-pentylene, 1,1-dimethyl-1,2-ethylene, 1,5-pentylene, 2-methyl-1,5-pentylene, 1,6-hexylene, 2,2 (4),4-trimethyl-1,6-hexamethylene, 1,8-octylene, 1,10-decylene, 1,12-dodecylene, (1,5,5-trimethylcyclohexan-1 -yl) methane-1,3, 1,3-cyclohexylenebis(methylene), 1,4-cyclohexylenebis(methylene), 1,3-phenylenebis (methylene), 2- and/or 4-methyl-1,3-cyclohexylene, N-methyl-4-aza-1,7-heptylene, N-ethyl-4-aza-1,7-heptylene, 3-aza-1,5-pentylene, 4- aza-1,7-heptylene, 3 -aza-1,6-hexylene, 7-aza-1,13-tridecylene, 3 -oxa-1,5-pentylene, 3,6-dioxa-1,8-octylene and 4,7-dioxa-1,10-decylene.

5. The method as claimed in claim 1, wherein the functional compound has at least one reactive group selected from epoxide, aziridine, carbonate, carboxylic anhydride, carboxylic acid, carboxylic ester, lactone, carbonyl chloride, ketone, aldehyde, 1,3-diketone, 1,3-keto ester, 1,3-keto amide, cyanate, thiocyanate, isocyanate, isothiocyanate, (meth)acrylate, (meth)acrylamide, (meth)acrylonitrile, maleate, maleamide, maleimide, fumarate, fumaramide, itaconate, itaconamide, crotonate and crotonamide.

6. The method as claimed in claim 1, wherein the polymer containing silane groups is selected from the group consisting of polyorganosiloxanes having terminal silane groups and organic polymers containing silane groups.

7. A composition comprising at least one amidine of the formula (I) and/or at least one reaction product as described in claim 1 and at least one polymer containing silane groups.

8. The composition as claimed in claim 7, wherein the polymer containing silane groups is a polyorganosiloxane having terminal silane groups.

9. The composition as claimed in claim 7, wherein the polymer containing silane groups is an organic polymer containing silane groups.

10. The composition as claimed in claim 7, wherein it is an adhesive or a sealant or a coating.

* * * * *